US008849452B2

(12) United States Patent
Takeda et al.

(10) Patent No.: US 8,849,452 B2
(45) Date of Patent: Sep. 30, 2014

(54) ROBOT AND CONTROL SYSTEM

(75) Inventors: Masanori Takeda, Wako (JP); Mitsuhide Kuroda, Wako (JP); Shigeru Kanzaki, Wakio (JP); Takahide Yoshiike, Wako (JP); Takumi Kamioka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 767 days.

(21) Appl. No.: 12/999,791

(22) PCT Filed: May 25, 2010

(86) PCT No.: PCT/JP2010/058806
§ 371 (c)(1),
(2), (4) Date: Dec. 17, 2010

(87) PCT Pub. No.: WO2011/016280
PCT Pub. Date: Feb. 10, 2011

(65) Prior Publication Data
US 2011/0231017 A1  Sep. 22, 2011

(30) Foreign Application Priority Data

Aug. 3, 2009 (JP) .............................. 2009-181070
Aug. 3, 2009 (JP) .............................. 2009-181071
Aug. 3, 2009 (JP) .............................. 2009-181072
Apr. 12, 2010 (JP) .............................. 2010-091801

(51) Int. Cl.
*G05B 19/18* (2006.01)
*B62D 57/032* (2006.01)
(52) U.S. Cl.
CPC .... B62D 57/032 (2013.01); *G05B 2219/40496* (2013.01)
USPC ........... 700/250; 700/245; 700/249; 700/253; 700/254; 700/255; 318/567; 318/568.1; 318/568.12; 318/568.13

(58) Field of Classification Search
None
See application file for complete search history.

(56) References Cited

U.S. PATENT DOCUMENTS 6,108,597 A * 8/2000 Kirchner et al. ................ 701/23
6,314,412 B1 * 11/2001 Yamaguchi et al. ............ 706/13
(Continued)

FOREIGN PATENT DOCUMENTS

| JP | 2003-334785 | 11/2003 |
| JP | 2004-167666 | 6/2004 |
| JP | 2007-125631 | 5/2007 |

OTHER PUBLICATIONS

Mosaic Reinforcement Learning Architecture: Symbolization by Predictability and Mimic Learning by Symbol, Kazuyuki Samejima et al., Jul. 2001.

(Continued)

*Primary Examiner* — Jason Holloway
*Assistant Examiner* — Jonathan L Sample
(74) *Attorney, Agent, or Firm* — Rankin, Hill & Clark LLP

(57) ABSTRACT

A control system or the like capable of causing a controlled object to act in an appropriate form in view of an action purpose of the controlled object to a disturbance in an arbitrary form.
Each of a plurality of modules modi, which are hierarchically organized according to the level of a frequency band, searches for action candidates which are candidates for an action form of a robot R matching with a main purpose and a sub-purpose while giving priority to a main purpose mainly under the charge of the module over a sub-purpose mainly under the charge of any other module. The actions of the robot R is controlled in a form in which the action candidates of the robot R searched for by a j-th module of a high frequency are reflected in preference to the action candidates of the robot R searched for by a (j+1)th module of a low frequency.

24 Claims, 14 Drawing Sheets

(56) References Cited

U.S. PATENT DOCUMENTS

| | | | |
|---|---|---|---|
| 6,324,529 B1* | 11/2001 | Kamihira et al. | 706/13 |
| 6,967,455 B2* | 11/2005 | Nakadai et al. | 318/568.12 |
| 7,620,477 B2* | 11/2009 | Bruemmer | 700/245 |
| 7,668,797 B2* | 2/2010 | Kuvich | 706/62 |
| 7,756,911 B2* | 7/2010 | Bacon et al. | 707/813 |
| 7,801,644 B2* | 9/2010 | Bruemmer et al. | 700/249 |
| 8,223,693 B2* | 7/2012 | Ko et al. | 370/328 |
| 8,271,292 B2* | 9/2012 | Osada et al. | 704/500 |
| 8,326,456 B2* | 12/2012 | Sakata et al. | 700/245 |
| 8,463,018 B2* | 6/2013 | Chung et al. | 382/153 |
| 8,514,802 B2* | 8/2013 | Junell | 370/329 |
| 8,706,939 B2* | 4/2014 | Ishikawa | 710/241 |
| 2002/0152006 A1* | 10/2002 | Bennett, III et al. | 700/245 |
| 2003/0056252 A1* | 3/2003 | Ota et al. | 901/47 |
| 2004/0078109 A1* | 4/2004 | Babikian et al. | 700/121 |
| 2004/0104702 A1* | 6/2004 | Nakadai et al. | 318/568.12 |
| 2004/0166905 A1* | 8/2004 | Cherniski et al. | 455/575.1 |
| 2005/0021483 A1* | 1/2005 | Kaplan et al. | 706/12 |
| 2005/0054381 A1* | 3/2005 | Lee et al. | 455/557 |
| 2005/0118996 A1* | 6/2005 | Lee et al. | 455/425 |
| 2005/0197739 A1* | 9/2005 | Noda et al. | 700/245 |
| 2006/0008151 A1* | 1/2006 | Lin et al. | 382/190 |
| 2006/0229822 A1* | 10/2006 | Theobald et al. | 702/19 |
| 2007/0282484 A1* | 12/2007 | Chung et al. | 700/245 |
| 2008/0043705 A1* | 2/2008 | Desai et al. | 370/346 |
| 2008/0091970 A1* | 4/2008 | Hanai et al. | 714/4 |
| 2008/0131255 A1* | 6/2008 | Hessler et al. | 414/788.1 |
| 2009/0034670 A1* | 2/2009 | Demir et al. | 375/354 |
| 2010/0029274 A1* | 2/2010 | Deshpande et al. | 455/435.3 |
| 2010/0322159 A1* | 12/2010 | Ko et al. | 370/329 |
| 2011/0231017 A1* | 9/2011 | Takeda et al. | 700/250 |

OTHER PUBLICATIONS

Module-level Credit Assignment in Multiple Model-based Reinforcement Learning, Kazuyuki Samejima et al., Technical Report of IEICE. NC2000-48 (Jul. 2000).

Inter-module credit assignment in modular reinforcement learning, Kazuyuki Samejima et al., Neural Networks 16 (2003) 985-994.

Multiple paired forward and inverse models for motor control, D.M. Wolpert, M. Kawato, 1998 Special Issue, Neural Networks. Received and accepted Apr. 30, 1998.

\* cited by examiner

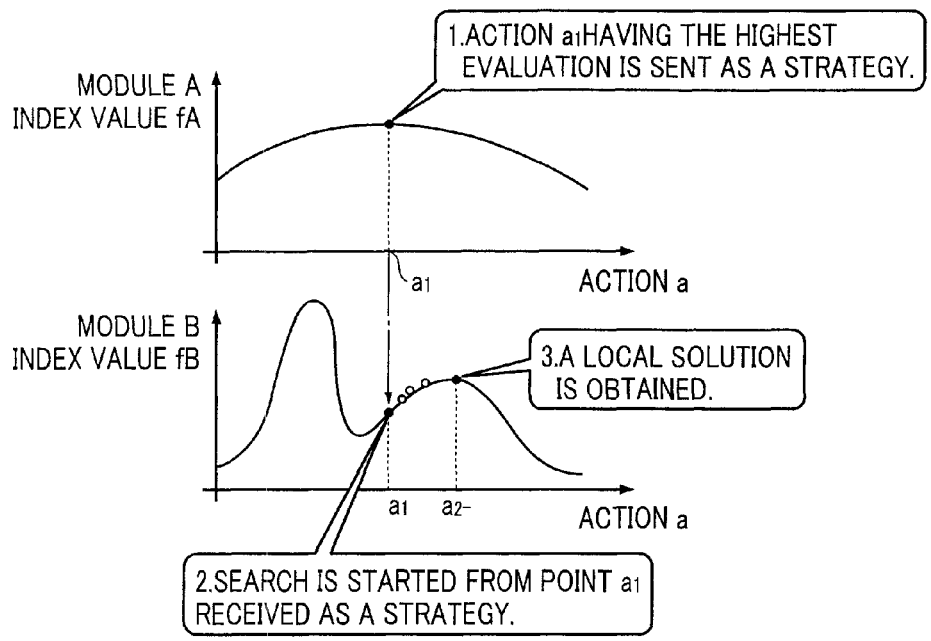
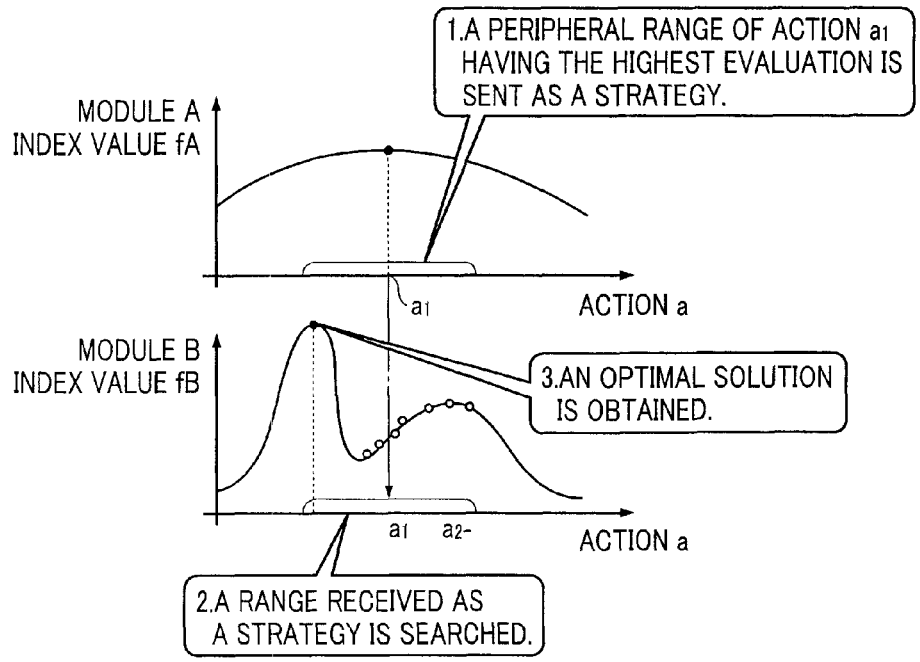

FIG.12 (a)　　　　FIG.12 (b)　　　　FIG.12 (c)
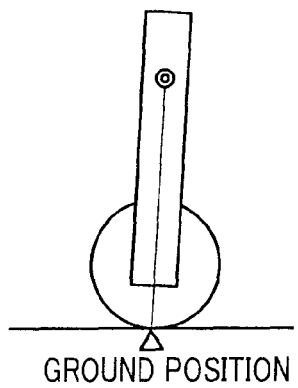
GROUND POSITION
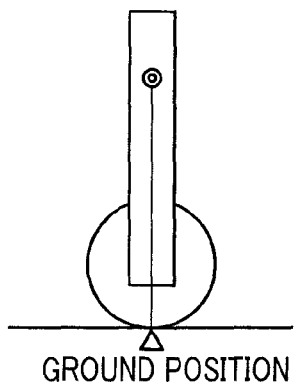
GROUND POSITION
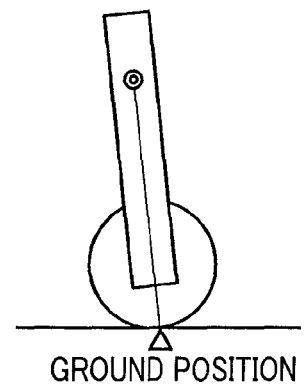
GROUND POSITION
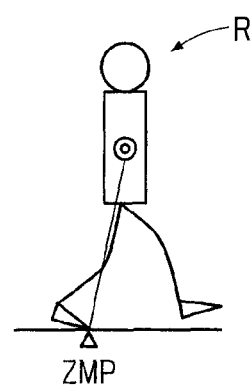
ZMP
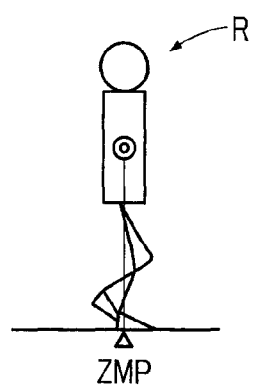
ZMP
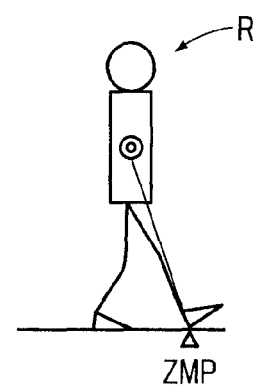
ZMP

ROBOT AND CONTROL SYSTEM

TECHNICAL FIELD

The present invention relates to a control system and a robot which is one of the controlled objects of the control system.

BACKGROUND ART

There has been suggested a technique for causing a robot to act adaptively to a fast disturbance such as an unexpected contact with an object (Refer to Japanese Patent Application Laid-Open No. 2004-167666). According to this technique, an adjustment is made in respect to a component percentage of a control command value of an integrated control system to a control command value of a high-speed local control system whose operation period is shorter than the integrated control system or distribution between them. For example, the percentage of the control command value of the local control system is adjusted to be high immediately after an occurrence of a fast disturbance so as to achieve a reflective action form of the robot against the disturbance.

Then, the percentage of the control command value of the integrated control system is adjusted to increase gradually as time passes from the occurrence of disturbance so as to cause the robot to recover the movement form in the normal state free from any disturbance. It should be noted here that the change curve of the component percentage of each control command value can be changed as time passes.

SUMMARY OF THE INVENTION

Problem to be Solved by the Invention

The action form of the robot, however, is likely to be inappropriate in view of a robot's purpose, depending on the form of a disturbance.

Therefore, it is an object of the present invention to provide a control system or the like capable of enabling a controlled object to act in an appropriate form in view of the action purpose of the controlled object against a disturbance in an arbitrary form.

Means for Solving the Problem

To solve the above problem, the present invention provides a control system comprising a plurality of modules hierarchically organized according to the level of a frequency band, wherein: each of the modules is configured to search for a plurality of action candidates which are candidates for an action form of a controlled object and evaluates total fitness in view of both of a main purpose and a sub-purpose in such a way that the contribution of main fitness to the main purpose mainly under the charge of the module is higher than the contribution of sub-fitness to the sub-purpose mainly under the charge of any other module, with respect to each of the action candidates; and the control system is configured to control an operation of the controlled object in a form in which an evaluation result of the total fitness obtained by a high-order module of a high frequency is reflected in preference to an evaluation result of the total fitness obtained by a low-order module of a low frequency (First invention).

According to the control system of the first invention, each of the plurality of modules searches for action candidates of the controlled object with priority given to the main purpose mainly under the charge of the module while taking into consideration the sub-purposes mainly under the charge of other modules. In this manner, it is possible to search for the action candidates of the controlled object with the purposes loosely shared with different modules.

Moreover, with respect to each of the action candidates, total fitness in view of both of the main purpose and the sub-purpose is evaluated in such a way that the contribution of the main fitness in view of the main purpose mainly under the charge of the module is higher than the contribution of the fitness in view of the sub-purpose mainly under the charge of any other module. Then, the action of the controlled object is controlled in a form in which an evaluation result of the total fitness obtained by a high-order module of a high frequency is reflected in preference to an evaluation result of the total fitness obtained by a low-order module of a low frequency.

Therefore, in the case of a disturbance, initially the high-order purpose mainly under the charge of the high-order module fast in response is reflected on the action form of the controlled object to rapidly reduce the effect of the disturbance. Moreover, with elapsed time, the low-order purpose mainly under the charge of the low-order module slow in response is also reflected on the action form of the controlled object to recover the action form of the controlled object matching with all of the plurality of purposes. This enables the controlled object to act in a form appropriate in view of the action purpose of the controlled object against a disturbance in an arbitrary form.

In the control system of the first invention, an intermediate module except a highest-order module of the highest frequency and a lowest-order module of the lowest frequency may be configured to evaluate the total fitness in such a way that high-order fitness in view of a high-order purpose is higher in contribution than low-order fitness in view of a low-order purpose with respect to each of the action candidates with the high-order purpose mainly under the charge of the high-order module having a frequency higher than the module and the low-order purpose mainly under the charge of the low-order module of a frequency lower than the module as the sub-purposes (Second invention).

According to the control system of the second invention, with respect to each of the action candidates searched for by itself, the intermediate module evaluates the total Fitness to all the purposes in such a way that the contribution increases in the order of the main fitness to the main purpose mainly under the charge of itself, the high-order fitness to the high-order purpose, and the low-order fitness to the low-order purpose. Thereby, the action of the controlled object is controlled in a form in which the purpose mainly under the charge of the intermediate module (intermediate purpose) is reflected in preference to the high-order purpose and the high-order purpose is reflected in preference to the high-order purpose. As a result, it is possible to cause the controlled object to act in a form appropriate in view of the action purpose of the controlled object against a disturbance in an arbitrary form.

In the control system of the second invention, the module having a low-order module of a frequency lower than the module may be configured to evaluate estimated low-order fitness by estimating the low-order fitness with respect to each of the action candidates and evaluate the total fitness with the estimated low-order fitness as the low-order fitness (Third invention).

According to the control system of the third invention, the module is able to search for action candidates in a form of reflecting not only the purpose mainly under the charge of a module lower in order than the module, but also the purpose mainly under the charge of a module further lower in order module than the low-order module. In other words, it is possible to search for the action candidates of the controlled object in a form in which the high-order module having two or more low-order modules different in order loosely shares the purposes mainly under the charge of the two low-order modules, respectively. As a result, it is possible to cause the controlled object to act in a form of preferentially reflecting the purpose mainly under the charge of the high-order module while indirectly or secondarily reflecting the purposes mainly under the charge of the low-order modules, respectively, against a disturbance in an arbitrary form.

In the control system of the third invention, the module having a low-order module of a frequency lower than the module may be configured to receive a low-order action candidate whose low-order total fitness, as the total fitness evaluated by the low-order module, among low-order action candidates as the action candidates searched for by the low-order module, is a maximum or a local maximum as a low-order action guideline from the low-order module and may evaluate a degree of approximation to the low-order action guideline as the estimated low-order fitness with respect to each of the action candidates searched for by the module (Fourth invention).

According to the control system of the fourth invention, the low-order action guideline received from the low-order module, which is to be evaluation criteria for the low-order fitness estimated by the module, reflects the low-order action guideline which the low-order module received from a further lower-order module. Therefore, the module is able to search for the action candidates in a form of reflecting not only the purpose mainly under the charge of a module lower in order than the module, but also the purpose mainly under the charge of a module further lower in order than the low-order module. In other words, it is possible to search for the action candidates of the controlled object in a form in which the high-order module having two or more low-order modules different in order loosely shares the purposes mainly under the charge of the two low-order modules, respectively. As a result, it is possible to cause the controlled object to act in a form of preferentially reflecting the purpose mainly under the charge of the high-order module while indirectly or secondarily reflecting the purposes mainly under the charge of the low-order modules, respectively, against a disturbance in an arbitrary form.

In the control system of the third invention, first to N-th modules may be provided as the plurality of modules, a first module as the highest-order module may be configured to evaluate first fitness $e_1$ to a first purpose as the main purpose with respect to each of first action candidates as the action candidates searched for by the first module, evaluate second estimated fitness $e_2\hat{}$ by estimating fitness to a second purpose mainly under the charge of a second module as a low-order module, and then evaluate first total fitness $f_1$ according to an evaluation equation $f_1=e_1(e_2\hat{}+1)$; an i-th module (i=2 to N-1) as the intermediate module may be configured to evaluate i-th fitness $e_i$ in view of an i-th purpose as the main purpose with respect to each of i-th action candidates as the action candidates searched for by the i-th module, evaluate (i-1)th fitness $e_{i-1}$ in view of the (i-1)th purpose as the high-order purpose, evaluate (i+1)th estimated fitness $e_{i+1}\hat{}$ by estimating fitness in view of an (i+1)th purpose as the low-order purpose, and then evaluate the i-th total fitness $f_i$ according to an evaluation equation $f_i=e_i(e_{i-1}(e_{i+1}\hat{}+1)+1)$; and an N-th module as the lowest-order module may be configured to evaluate N-th fitness $e_N$ to an N-th purpose as the main purpose with respect to each of N-th action candidates as the action candidates searched for by the N-th module, evaluate the (N-1)th fitness $e_{N-1}$ mainly under the charge of an (N-1)th module as the high-order module, and then evaluate the i-th total fitness $f_i$ according to an evaluation equation $f_N=e_N(e_{N-1}+1)$ (Fifth invention).

According to the control system of the fifth invention, it is possible to search for the action candidates of the controlled object in a form in which the high-order module having two or more low-order modules different in order (a one-order lower module and a two-order lower module) loosely shares the purposes mainly under the charge of the two low-order modules, respectively. As a result, it is possible to cause the controlled object to act in a form of preferentially reflecting the purpose mainly under the charge of the high-order module while indirectly or secondarily reflecting the purposes mainly under the charge of the low-order modules, respectively, against a disturbance in an arbitrary form.

In the control system of the fifth invention, the j-th module (j=1, 2, ..., N) may be configured to evaluate j-th fitness $e_j$ to a j-th purpose as the main purpose at a fixed value, with respect to j-th action candidates included in j-th specified action candidate group among all j-th action candidates as the action candidates searched for by the j-th module, while evaluating the j-th fitness $e_j$ at a value lower than the fixed value with respect to the j-th action candidates not included in the j-th specified action candidate group among all j-th action candidates (Sixth invention).

According to the control system of the sixth invention, with respect to the j-th action candidates included in the j-th specified action candidate group among all j-th action candidates searched for by the j-th module, the j-th fitness $e_j$ is evaluated at a certain value. On the other hand, with respect to the j-th action candidates not included in the j-th specified action candidate group, the j-th fitness $e_j$ is evaluated at a value lower than the fixed value. Specifically, in an action candidate set (the j-th solution space) having the j-th fitness $e_j$ of a sufficiently high value among the possible sets of action candidates, there are formed a region in which the j-th fitness $e_j$ is evaluated at the fixed value (flat region) and a region in which the j-th fitness $e_j$ is lower than the fixed value. The configuration is based on a concept that the j-th action candidate matching with the j-th purpose to some extent may be considered to have approximately equivalent j-th fitness.

The formation of the flat region expands a region in which it is possible to search for a solution whose total fitness is the maximum or the local maximum in the j-th solution space. Therefore, if the high-order module is adapted to receive a low-order action candidate whose low-order total fitness is the maximum or the local maximum as a low-order action guideline from the low-order module and to evaluate the degree of approximation to the low-order action guideline as estimated low-order fitness with respect to each of the action candidates which the high-order module searched for (see the fourth invention), the region in which the high-order module can search for the solution in the solution space is expanded.

Moreover, with respect to the plurality of the j-th action candidates included in the flat region in the j-th solution space, there is no need to consider the superiority and inferiority depending on the level of the j-th fitness $e_j$. This prevents a solution which increases the j-th fitness more than required from being searched for and thus prevents excessive optimization of the operation control of the controlled object. Furthermore, the j-th module only needs to search for the j-th action candidate whose total fitness is the maximum or the local maximum according to the fitness in view of the sub-purposes mainly under the charge of other modules (one or both of the (j-1)-th module and the (j+1)-th module). In other words, it is possible to cause the j-th module to focus on searching for a solution which increases the fitness in view of the sub-purposes, instead of the main purpose.

Accordingly, it is possible to evaluate or calculate the j-th total fitness $f_j$ while questing to reduce the arithmetic operation load of each module for evaluating the j-th fitness $e_j$ and consequently to enable earlier calculation of an arithmetic operation result. This enables the controlled object to rapidly respond or act to a disturbance in an arbitrary form in an appropriate form in view of the action purpose of the controlled object.

In the control system of the sixth invention, the j-th module may be configured to evaluate the j-th fitness $e_j$ at the fixed value, with the j-th action candidates whose divergence from a reference point defined in a state space adequate for the j-th purpose among all of the j-th action candidates is equal to or less than a j-th threshold as the j-th action candidates included in the j-th specified action candidate group, while evaluating the j-th fitness $e_j$ according to a decreasing function in which the divergence is continuous or progressive on the basis of the divergence with respect to the j-th action candidates not included in the j-th specified action candidate group among all of the j-th action candidates (Seventh invention).

According to the control system of the seventh invention, similarly to the control system of the sixth invention, it is possible to evaluate or calculate the j-th total fitness $f_j$ while questing to reduce the arithmetic operation load for evaluating the j-th fitness $e_j$ and consequently to enable earlier calculation of an arithmetic operation result. This enables the controlled object to rapidly respond or act to a disturbance in an arbitrary form in an appropriate form in view of the action purpose of the controlled object.

In the control system of the first invention, each of the modules may be configured to search for action candidates which are candidates for the action form of the controlled object matching with the main purpose and the sub-purpose while giving priority to the main purpose over the sub-purpose (Eighth invention).

According to the control system of the eighth invention, each of the modules searches for action candidates of the controlled object taking into consideration the purposes of other modules while giving priority to the main purpose mainly under the charge of the module. In this manner, it is possible to search for action candidates of the controlled object with the purposes loosely shared among different modules. Then, the actions of the controlled object are controlled in a form in which the high-order purpose mainly under the charge of the high-order module of a high frequency is reflected in preference to the low-order purpose mainly under the charge of the low-order module of a low frequency.

Therefore, in the case of a disturbance, the high-order purpose mainly under the charge of the high-order module fast in response is reflected on the action form of the controlled object initially so as to reduce the effect of the disturbance quickly. Furthermore, low-order purposes mainly under the charge of the low-order modules slow in response are reflected on the action forms of the controlled object with elapsed time so as to recover the action forms of the controlled object which match with all of the plurality of purposes. This enables the controlled object to act in an appropriate form in view of the action purposes of the controlled object against a disturbance in an arbitrary form.

In the control system of the eighth invention, each of the modules may be configured to perform a current time's search for action candidates of the controlled object according to a search strategy based on a previous time's search result obtained by the module and a previous time's search result of the action candidates of the controlled object obtained by the any other module while giving priority to the previous time's search result of the action candidates of the controlled object by the module over the previous time's search result of the action candidates of the controlled object by the any other module (Ninth invention).

According to the control system of the ninth invention, the current time's search for action candidates is performed by one module on the basis of the previous time's search result obtained by the one module and the search result of the action candidates obtained by any other module. The previous time's search result of the action candidates by the one module matches with the sub-purpose mainly under the charge of the any other module in addition to the purpose mainly under the charge of the one module. Therefore, it is possible to search for action candidates of the controlled object with the purposes loosely shared among different modules.

In the control system of the ninth invention, each of the modules may be configured to select a part of the action candidates searched for at the previous time with higher probability as the total fitness evaluated at the previous time is higher and perform the current time's search for the action candidates in a peripheral region of the selected action candidates in the state space defined by the action candidates (10th invention).

According to the control system of the 10th invention, a part of the action candidates searched for at the previous time are selected with higher probability as the total fitness to the purposes mainly under the charge of the corresponding module and each of other modules is higher and the current time's search for the action candidates is performed in a peripheral region of the selected action candidates. Therefore, it is possible to search for action candidates more matching with the main purpose and the sub-purpose in a form having diversity which is not excessively tied to the previous time's search result. As a result, the repetition of the search for the action candidates enables the controlled object to act in an appropriate form in view of the action purpose of the controlled object against a disturbance in an arbitrary form as described above.

In the control system of the 10th invention, each of the modules may be configured to perform the current time's search for the action candidates in a narrower peripheral region as the total fitness evaluated at the previous time is higher with reference to the action candidates selected among the action candidates searched for at the previous time in the state space (11th invention).

According to the control system of the 11th invention, the extent of the peripheral region of the previous time's selected action candidates which is the current time's search area for the action candidates in the state space depends on the level of the total fitness of the previous time's selected action candidates based on the purpose mainly under the charge of the corresponding module and of each of other modules. Therefore, it is possible to search for action candidates more matching with the main purpose and the sub-purpose in a form having convergence without waste such as significantly deviating from the previous time's search result on the basis of the previous time's search result. As a result, the repetition of the search for the action candidates enables the controlled object to act in an appropriate form in view of the action purpose of the controlled object against a disturbance in an arbitrary form as described above.

In the control system of the 10th invention, each of the modules may be configured to perform the current time's search for the action candidates in a peripheral region of irregularly selected points in the state space in addition to the peripheral region of the action candidates selected among the action candidates searched for at the previous time (12th invention).

According to the control system of the 12th invention, the peripheral region of irregularly selected points in the state space is also a region in which the current time's search for the action candidates is performed. Therefore, it is possible to search for action candidates more matching with the main purpose and the sub-purpose in a form having diversity without being excessively tied to the previous time's search result.

In the control system of the 12th invention, each of the modules may be configured to search for the action candidates of the controlled object, with a high-order module as the any other module in the case where there is a module one order higher than the module and with a low-order module as the any other module in the case where there is a module one order lower than the module (13th invention).

According to the control system of the 13th invention, the action candidates of the controlled object are searched for with the purposes loosely shared among a plurality of modules one order different from each other. Specifically, the highest-order module searches for the action candidates matching with the purpose (sub-purpose) mainly under the charge of the module one order lower than the highest-order module and the main purpose mainly under the charge of the highest-order module. Moreover, the lowest-order module searches for the action candidates matching with the purpose (sub-purpose) mainly under the charge of the module one order higher than the lowest-order module and the main purpose mainly under the charge of the lowest-order module Furthermore, an intermediate module except the highest-order module and the lowest-order module searches for action candidates matching with the purpose mainly under the charge of the module one order higher than the intermediate module and of the module one order lower than the intermediate module and the purpose mainly under the charge of the intermediate module.

In the control system of the eighth invention, each of the modules may search for the action candidates which determine the position or the position and posture of a moving apparatus as the controlled object, and each of the modules may search for the action candidates of the moving apparatus for a shorter period in comparison with the low-order module of a low frequency as the high-order module has a higher frequency (14th invention).

According to the control system of the 14th invention, it is possible to cause each module to search for action candidates which determine the position or the position and posture (hereinafter, appropriately referred to as "position and the like") of a moving apparatus as the controlled object for an appropriate period of time according to an appropriate purpose depending on the level of the frequency band or the length of the operation period. This enables the moving apparatus to act in such a way that the position and the like are appropriately controlled in view of the action purpose of the moving apparatus against a disturbance in an arbitrary form.

The control system of the 14th invention may comprise a first module, a second module, and a third module, as the plurality of modules, configured to search for the position trajectory or position trajectory and posture trajectory of a robot as the moving apparatus having a base and a plurality of legs extended from the base, as the action candidates. In the control system, the first module may be configured to search for a gait over a first specified number of steps of the robot for causing the robot to stabilize the posture as a first action candidate; the second module may be configured to search for a local route, as a second action candidate, which determines a gait over a second specified number of steps, which is greater than the first specified number of steps, for causing the robot to prevent a contact with an object; and the third module may be configured to search for a general route for causing the robot to reach a target position as a third action candidate (15th invention).

According to the control system of the 15th invention, it is possible to cause the first module having the highest frequency to search for the first action candidate for a short period of time at the occurrence of a disturbance with the first action purpose of "causing the robot to stabilize the posture" as the main purpose while reflecting the sub-purpose mainly under the charge of any other module. In addition, it is possible to cause the second module having an intermediate frequency to search for the second action candidate for a long period of time in comparison with the first action candidate with the second action purpose of "causing the robot to prevent contact with an object" as the main purpose while reflecting the sub-purpose mainly under the charge of any other module. Moreover, it is possible to cause the third module having the lowest frequency to search for the third action candidate for a long period of time in comparison with the second action candidate with the third action purpose of "causing the robot to move to a target position" while reflecting the sub-purpose mainly under the charge of any other module.

The term "any other module" viewed from the first module can correspond to one or both of the second module and the third module. Similarly, the term "any other module" viewed from the second module can correspond to one or both of the first module and the third module. Moreover, the term "any other module" viewed from the third module can correspond to one or both of the first module and the second module.

Furthermore, the actions of the controlled object are controlled in a form in which an evaluation result of the total fitness obtained by a high-order module of a high frequency is reflected in preference to an evaluation result of the total fitness obtained by a low-order module of a low frequency. As a result, it is possible to cause the controlled object to act in an appropriate form in view of the action purpose of the controlled object against a disturbance in an arbitrary form.

In the control system of the first invention, each of the modules may be configured to predict a plurality of future states of the controlled object according to each of the action candidates searched for by the module and evaluate the total fitness on the basis of each of the future states with respect to each of the action candidates (16th invention).

According to the control system of the 16th invention, each module evaluates the total fitness to each of the main purpose mainly under the charge of the module and the sub-purpose mainly under the charge of any other module with respect to each of the action candidates on the basis of each future state predicted according to each of the action candidates by the module. Then, the actions of the controlled object are controlled in a form in which an evaluation result of the total fitness obtained by a high-order module of a high frequency is reflected in preference to an evaluation result of the total fitness obtained by a low-order module of a low frequency as described above. As a result, it is possible to cause the controlled object to act in an appropriate form in view of the action purpose of the controlled object against a disturbance in an arbitrary form.

In the control system of the 16th invention, the module having a high-order module of a higher frequency than the module may be configured to predict further future states of the controlled object subsequent to the future states of the controlled object predicted by the high-order module, and the operation of the controlled object may be controlled in a form in which the evaluation result of the total fitness obtained by the high-order module of a high frequency is reflected in precedence to the evaluation result of the total fitness obtained by a low-order module of a low frequency (17th invention).

According to the control system of the 17th invention, the operation of the controlled object is controlled in a form in which an evaluation result of the total fitness obtained by a high-order module of a high frequency is reflected in preference to an evaluation result of the total fitness obtained by a low-order module of a low frequency. As a result, the actions of the controlled object are controlled in a form in which the high-order purpose mainly under the charge of the high-order module of a high frequency is reflected in preference to the low-order purpose mainly under the charge of the low-order module of a low frequency.

Therefore, in the case of a disturbance, the high-order purpose mainly under the charge of the high-order module fast in response is reflected on the action form of the controlled object initially so as to reduce the effect of the disturbance quickly. Furthermore, low-order purposes mainly under the charge of the low-order modules slow in response are reflected on the action forms of the controlled object with elapsed time so as to recover the action forms of the controlled object which match with all of the plurality of purposes. This enables the controlled object to act in an appropriate form in view of the action purposes of the controlled object against a disturbance in an arbitrary form.

In the control system of the 17th invention, each of the modules may be configured to search for the action candidates of the moving apparatus for a shorter period in comparison with the low-order module of a low frequency as the high-order module has a higher frequency (18th invention).

According to the control system of the 18th invention, it is possible to cause each module to search for action candidates for an appropriate period of time according to an appropriate purpose depending on the level of the frequency band or the length of the operation period. Then, the actions of the controlled object are controlled in a form in which the high-order purpose mainly under the charge of the high-order module of a high frequency is reflected in precedence to the sub-purpose mainly under the charge of the low-order module of a low frequency as described above. As a result, it is possible to cause the controlled object to act in an appropriate form in view of the action purpose of the controlled object against a disturbance in an arbitrary form.

In the control system of the 18th invention, at least one module among the plurality of modules may be configured to predict the state of the controlled object at a future time point after an elapse of a shorter period of an action form than the action candidates searched for by a highest frequency module according to the current state of the controlled object, as a nearest future state, and each of the plurality of modules may be configured to predict the future state of the controlled object according to the action candidates searched for by the module, subsequent to the nearest future state (19th invention).

According to the control system of the 19th invention, the future state of the controlled object according to the action candidate can be appropriately predicted with the nearest future state determined according to the current state of the controlled object as the origin. Therefore, in the case of a disturbance, it is possible to prevent a situation in which a future state is predicted to be a state largely deviated in view of the current state of the controlled object varying according to the presence or absence of the disturbance or the level thereof.

Then, the total fitness is evaluated with respect to each of the action candidates on the basis of each of the future states and the actions of the controlled object are controlled on the basis of the evaluation result. This enables the controlled object to act in an appropriate form in view of the action purpose of the controlled object against a disturbance in an arbitrary form.

In the control system of the 18th invention, each of the modules may be configured to search for the action candidates which determine the position or the position and posture of the moving apparatus as the controlled object and predict the position or the position and posture of the moving apparatus as the future state of the controlled object (20th invention).

According to the control system of the 20th invention, it is possible to cause each module to search for action candidates which determine the position or the position and posture (hereinafter, appropriately referred to as "position and the like") of the moving apparatus as the controlled object for an appropriate period of time according to an appropriate purpose depending on the level of the frequency band or the length of the operation period and then to predict the position and the like of the moving apparatus as a future state. This enables the moving apparatus to act in such a way that the position and the like are appropriately controlled in view of the action purpose of the moving apparatus against a disturbance in an arbitrary form.

The control system of the 20th invention may comprise a first module, a second module, and a third module, as the plurality of modules, configured to search for the position trajectory or position trajectory and posture trajectory of a robot as the moving apparatus having a base and a plurality of legs extended from the base as the action candidates. In the control system, the first module may be configured to search for a gait over a first specified number of steps of the robot to cause the robot to stabilize the posture as a first action candidate and may predict the position or the position and posture in the future of the robot according to each of the first action candidates as a plurality of first future states; the second module may be configured to search for a local route, as a second action candidate, which determines a gait over a second specified number of steps, which is greater than the first specified number of steps, for causing the robot to prevent a contact with an object and may predict the position or the position and posture in the future of the robot according to each of the second action candidates as a plurality of second future states; and the third module may be configured to search for a general route for causing the robot to reach a target position or for causing the robot to reach the target position with a target posture as a third action candidate, and may predict the position or the position and posture in the future of the robot according to each of the third action candidates as a plurality of third future states (21st invention).

According to the control system of the 21st invention, it is possible to cause the first module having the highest frequency to search for the first action candidate for a short period of time at the occurrence of a disturbance with the first action purpose of "causing the robot to stabilize the posture" as the main purpose while reflecting the sub-purpose (sub-purpose) mainly under the charge of any other module and to predict the first future state. In addition, it is possible to cause the second module having an intermediate frequency to search for the second action candidate for a long period of time in comparison with the first action candidate with the second action purpose of "causing the robot to prevent contact with an object" as the main purpose while reflecting the sub-purpose (sub-purpose) mainly under the charge of any other module and to predict the second future state. Moreover, it is possible to cause the third module having the lowest frequency to search for the third action candidate for a long period of time in comparison with the second action candidate with the third action purpose of "causing the robot to move to a target position" while reflecting the sub-purpose (sub-purpose) mainly under the charge of any other module and to predict the third future state.

The term "any other module" viewed from the first module can correspond to one or both of the second module and the third module. Similarly, the term "any other module" viewed from the second module can correspond to one or both of the first module and the third module. Moreover, the term "any other module" viewed from the third module can correspond to one or both of the first module and the second module.

Furthermore, the actions of the robot as the controlled object are controlled in a form in which each action purpose is reflected according to the evaluation result of the total fitness based on the future state predicted by each module. As a result, it is possible to control the position and the like of the robot in an appropriate form in view of each action purpose of the robot against a disturbance in an arbitrary form.

In the control system of the 21st invention, at least one module among the first module, the second module, and the third module may be configured to predict the position or the position and posture of the robot at a future time point after an elapse of a gait over a reference number of steps less than the first specified number of steps as the nearest future state according to the current state of the robot; and the first module may be configured to predict the position or the position and posture of the robot at the future time point after an elapse of a gait over the first specified number of steps as the first future state with the nearest future state as the origin; the second module may be configured to predict the position trajectory or the position trajectory and posture trajectory of the robot moving along the local route as the second future state with the nearest future state as the origin; and the third module may be configured to predict the position trajectory or the position trajectory and posture trajectory of the robot moving along the general route as the third future state with the nearest future state as the origin (22nd invention).

According to the control system of the 22nd invention, the future state of the controlled object according to the action candidate can be appropriately predicted with the nearest future state determined according to the current state of the robot, which is the controlled object, as the origin. Therefore, in the case of a disturbance, it is possible to prevent a situation in which a future state is predicted to be a state largely deviated in view of the current state of the controlled object varying according to the presence or absence of the disturbance or the level thereof. Moreover, the actions of the robot as the controlled object are controlled in a form in which the action purposes are reflected according to the evaluation result of the total fitness based on the future states predicted by the respective modules. As a result, the position and the like of the robot can be controlled in an appropriate form in view of the action purpose of the robot against a disturbance in an arbitrary form.

To solve the above problem, the present invention provides a robot having a base and a plurality of legs extended from the base, as the moving apparatus which moves with the movements of the plurality of legs, wherein the robot has the control system of the 15th invention (23rd invention).

According to the robot of the 23rd invention, in the case of a disturbance, the high-order purpose mainly under the charge of the high-order module fast in response is reflected on the action form of the robot as the controlled object initially so as to reduce the effect of the disturbance quickly. Furthermore, low-order purposes mainly under the charge of the low-order modules slow in response are reflected on the action forms of the robot as the controlled object with elapsed time so as to recover the action forms of the robot which match with all of the plurality of purposes. This enables the robot to act in an appropriate form in view of the action purposes of the robot against a disturbance in an arbitrary form.

To solve the above problem, the present invention provides a robot having a base and a plurality of legs extended from the base, as the moving apparatus which moves with the movements of the plurality of legs, wherein the robot has the control system of the 21st invention (24th invention).

According to the robot of the 24th invention, in the case of a disturbance, the high-order purpose mainly under the charge of the high-order module fast in response is reflected on the action form of the robot as the controlled object initially so as to reduce the effect of the disturbance quickly. Furthermore, low-order purposes mainly under the charge of the low-order modules slow in response are reflected on the action forms of the robot as the controlled object with elapsed time so as to recover the action forms of the robot which match with all of the plurality of purposes. This enables the robot to act in an appropriate form in view of the action purposes of the robot against a disturbance in an arbitrary form.

BRIEF DESCRIPTION OF THE DRAWINGS

FIG. 10 is an explanatory diagram of the diversity of the action search method;

FIG. 12 is an explanatory diagram of a relationship between the behavior state of the robot and the behavior state of an inverted pendulum;

MODE FOR CARRYING OUT THE INVENTION

A control system according to the present invention and preferred embodiments of a controlled object thereof will be described below by using the accompanying drawings.

(Configuration of Robot)

First, the configuration of a robot as one embodiment of the present invention will be described.

Figure 1:
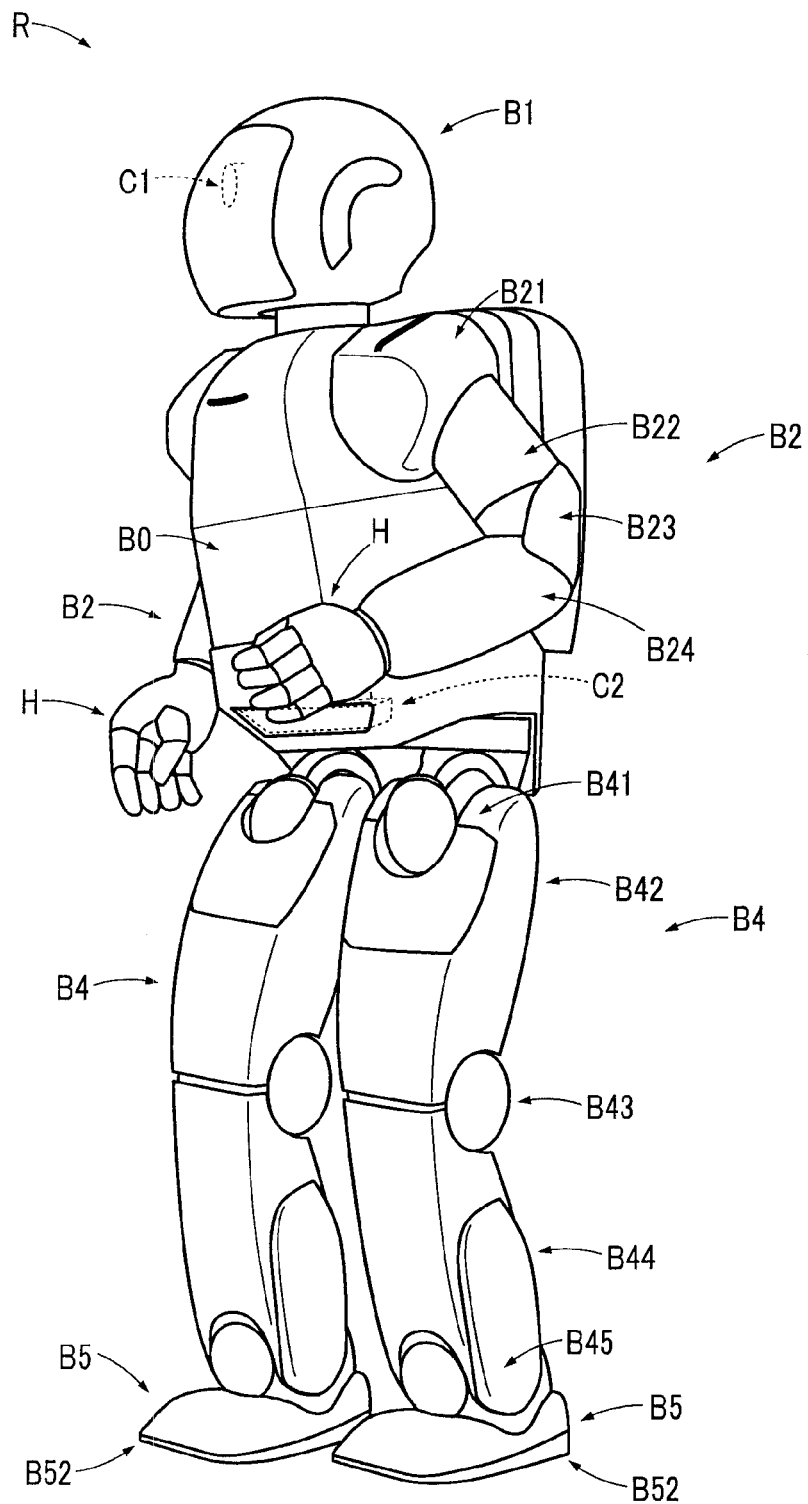
FIG. 1 is a configuration schematic diagram of a robot according to one embodiment of the present invention.

The robot R shown in FIG. 1 is a legged locomotion robot and, similarly to a human being, it has a base B0, a head B1 disposed above the base B0, left and right arms B2 disposed in the upper part of the base B0 so as to be extended from both sides of the upper part, hands H disposed at the end of the left and right arms B2, respectively, and left and right legs B4 extended from the bottom of the base B0 downward.

The base B0 includes the upper part and the lower part vertically connected to each other so as to be relatively rotatable around the yaw axis. The head B1 is movable such as being rotatable around the yaw axis relative to the base B0.

The arm B2 includes a first arm link B22 and a second arm link B24. The base B0 is connected to the first arm link B21 first arm link B22 via a shoulder joint mechanism (a first arm joint mechanism) B21, the first arm link B22 is connected to the second arm link B24 via an elbow joint mechanism (a second arm joint mechanism) B23, and the second arm link B24 is connected to the hand H via a wrist joint mechanism (a third arm joint mechanism) B25. The shoulder joint mechanism B21 has a degree of freedom in rotation around the roll, pitch, and yaw axes, the elbow joint mechanism B23 has a degree of freedom in rotation around the pitch axis, and the wrist joint mechanism B25 has a degree of freedom in rotation around the roll, pitch, and yaw axes.

The leg B4 includes a first leg link B42, a second leg link B44, and a foot B5. The base B0 is connected to the first leg link B42 via a hip joint mechanism (a first leg joint mechanism) B41, the first leg link B42 is connected to the second leg link B44 via a knee joint mechanism (a second leg joint mechanism) B43, and the second leg link B44 is connected to the foot B5 via an foot joint mechanism (a third leg joint mechanism) B45.

The hip joint mechanism B41 has a degree of freedom in rotation around the roll, pitch, and yaw axes, the knee joint mechanism B43 has a degree of freedom in rotation around the pitch axis, and the foot joint mechanism B45 has a degree of freedom in rotation around the roll and pitch axes. The hip joint mechanism B41, the knee joint mechanism B43, and the foot joint mechanism B45 constitute "a leg joint mechanism group." In addition, translational and rotational degrees of freedom of each joint mechanism included in the leg joint mechanism group may be changed appropriately. Moreover, on the premise of the omission of one arbitrary joint mechanism among the hip joint mechanism B41, the knee joint mechanism B43, and the foot joint mechanism B45, the combination of the remaining two joint mechanisms may constitute the leg joint mechanism group. Further, if the leg B4 has a second leg joint mechanism other than the knee joint, the leg joint mechanism group may be made so as to include the second leg joint mechanism. The foot B5 is provided at its bottom with an elastic material B52 as disclosed in Japanese Patent Application Laid-Open No. 2001-129774 in order to absorb shock at landing.

The robot R is equipped with a plurality of internal state sensors $S_1$ for use in measuring the internal states such as the position and posture of the robot R in the world coordinate system. The internal state sensors $S_1$ are an encoder (not shown) which outputs a signal corresponding to a flexion angle (joint angle) of each joint mechanism of the robot R, an inclination sensor which outputs a signal corresponding to the posture (identified by an azimuth angle and an elevation angle) of the base B0, a pressure sensor which determines whether the foot B5 lands on the floor or leaves the floor, and the like. The internal state sensor $S_1$ may be an imaging device for use in recognizing the position of the robot R in the world coordinate system by imaging the surroundings of the robot R and recognizing the position of an indicator which is set to the world coordinate system on the basis of the imaging coordinates.

For example, there can be used as the imaging device, for example, a pair of left and right head cameras C1, which are mounted on the head B1 so as to have an imaging range extending on the forward side of the robot R and are capable of sensing light in various frequency bands, such as CCD cameras or infrared cameras. Moreover, it is possible to use a waist camera (active sensor) C2, which is mounted on the front-side lower part of the base B0 and is used to measure the position, the azimuth angle, and the like of this object by sensing a reflected light on the object of a near-infrared laser beam emitted to the forward lower side of the robot R.

The robot R is equipped with an external state sensor $S_2$ for use in measuring the external state, such as the position, of the object in the surroundings thereof. The imaging device as described above corresponds to the external state sensor $S_2$.

The robot R has a control system 1 and a plurality of actuators 2 for use in moving each of the plurality of joint mechanisms. The respective operations of the actuators 2 are controlled according to control commands, which are output from the control system 1 according to the internal state and the external state of the robot R, thereby enabling the robot R to act adaptively in various forms.

(Configuration of Control System)

Figure 2:
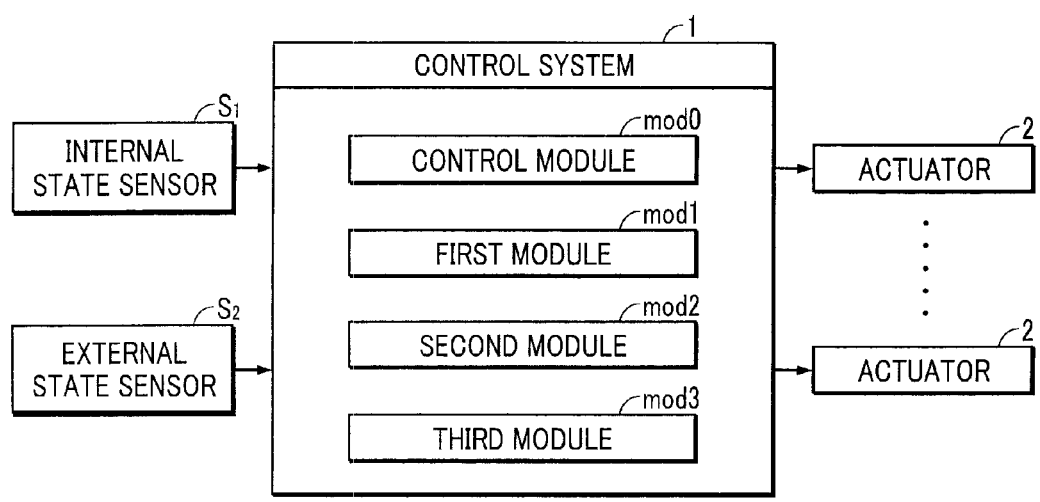
FIG. 2 is a configuration schematic diagram of a control system of the robot.

The control system 1 shown in FIG. 2 includes a control module mod0, a first module (stabilization module) mod1, a second module (obstacle avoidance module) mod2, and a third module (route generation module) mod3.

(Configuration of First Module)

The first module mod1 mainly takes charge of causing the robot R to stabilize the posture thereof as the main purpose (first action purpose). The first module mod1 is adapted to repeat the generation of an output signal by performing an arithmetic operation of an input signal for each first operation period $T_1$.

(Configuration of Second Module)

The second module mod2 mainly takes charge of causing the robot R to prevent contact with an object as the main purpose (second action purpose). The second module mod2 is adapted to repeat the generation of an output signal by performing an arithmetic operation of an input signal for each second operation period $T_2$ which is longer than the first operation period $T_1$ (for example, $T_2=2T_1$).

(Configuration of Third Module)

The third module mod3 mainly takes charge of causing the robot R to move to a target position as the main purpose (third action purpose). The third module mod3 is adapted to repeat the generation of an output signal by performing an arithmetic operation of an input signal for each third operation period $T_3$ which is longer than the second operation period $T_2$ (for example, $T_3=2T_2$).

(Functions of Robot)

The functions of the robot R having the above configurations will be described hereinafter.

(Arithmetic Operation Procedure of Control System)

The control system 1 controls the operations of the actuators 2 and the actions of the robot R according to the procedure described below.

First, a control module mod0 recognizes the current state of the robot R. Specifically, the control module mod0 recognizes the internal states such as the position (the landing position, the ZMP position, or the like) and the posture (the posture of the base B0) of the robot R in the world coordinate system on the basis of an output signal from the internal state sensor $S_1$. Moreover, the control module mod0 recognizes the external states such as the size and the position in the world coordinate system of an object around the robot R on the basis of an output signal from the external state sensor $S_2$. In addition, the control module mod0 may recognize a part or all of the external states by an input or a transmission of data, which represents the external states such as the size and position of the object, from the outside of the robot R to the control system 1.

Figure 3:
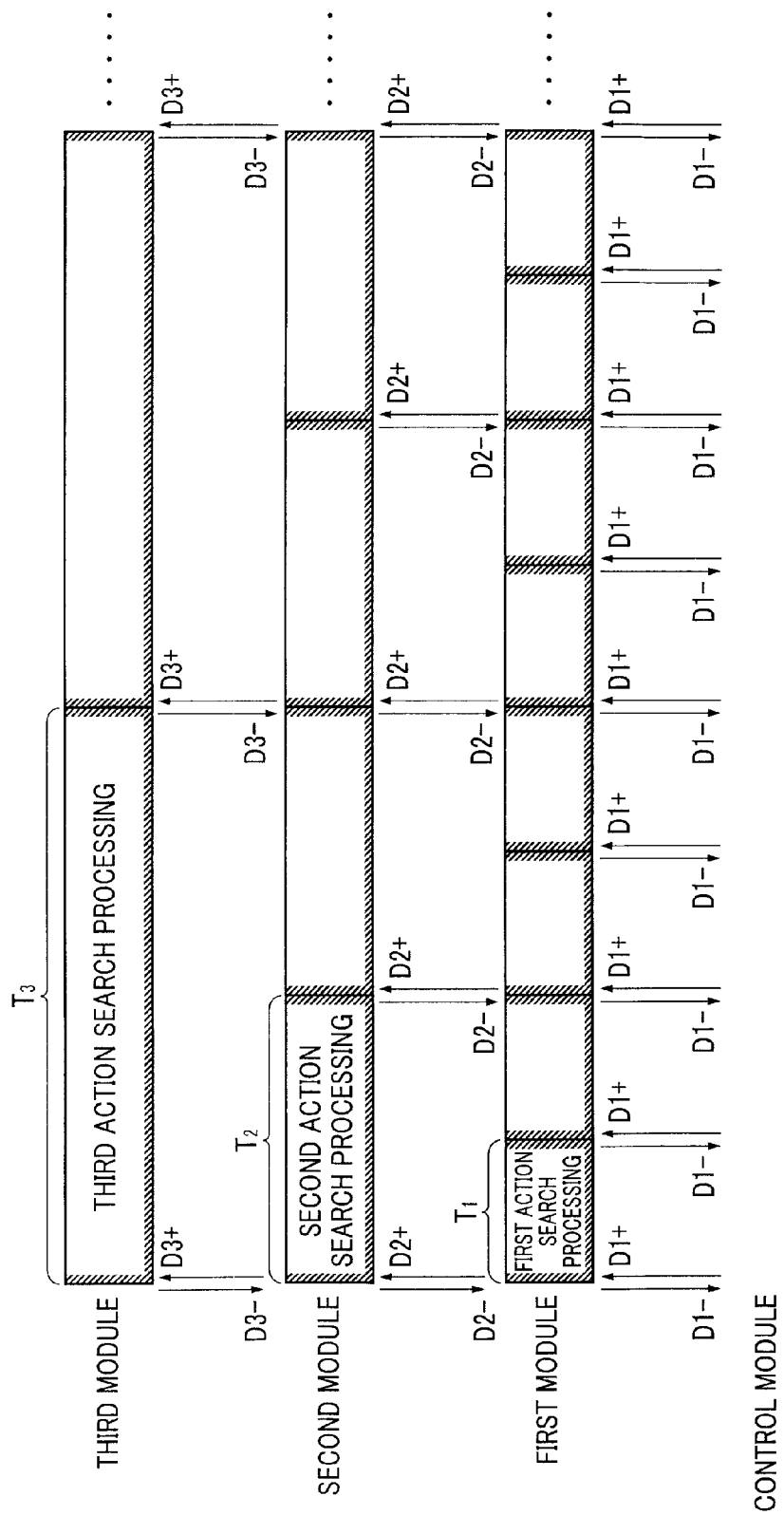
FIG. 3 is an explanatory diagram of signal exchanges between parallel modules.

The "current state" of the robot R is input from the control module mod0 to the first module mod1 for each first operation period $T_1$ (see the arrow $D_{1+}$ in FIG. 3). Moreover, a "second search strategy" and a "second action guideline" obtained by performing second action search processing are input from the second module mod2 to the first module mod1 for each second operation period $T_2$ (see the arrow $D_{2-}$ in FIG. 3).

According to the input signals, the first module mod1 performs "first action search processing" for each first operation period $T_1$. A "first action guideline" obtained by performing the first action search processing is input from the first module mod1 to the control module mod0 for each first operation period $T_1$ (see the arrow $D_{1-}$ in FIG. 3).

In addition, if there is no input signal from the second module mod2 at the start time of the current cycle of the first module mod1, the first action search processing is performed by using the input signal from the second module mod2 at the start time of a recent past cycle of the first module mod1.

The current state or the latest predicted state of the robot R in the nearest future according to the current state are input from the first module mod1 to the second module mod2 for each second operation period $T_2$ (see the arrow $D_{2+}$ in FIG. 3). Moreover, a "first search strategy (including a first action reserve)" obtained by performing first action search processing is input from the first module mod1 to the second module mod2 for each second operation period $T_2$ (see the arrow $D_{2+}$ in FIG. 3). In addition, a "third search strategy" and a "third action guideline" obtained by performing third action search processing are input from the third module mod3 to the second module mod2 for each third operation period $T_3$ (see the arrow $D_{3-}$ in FIG. 3).

According to the input signals, the second module mod2 performs "second action search processing" for each second operation period $T_2$. A "second action strategy" and a "second action guideline" obtained thereby are input from the second module mod2 to the first module mod1 for each second operation period $T_2$ (see the arrow $D_{2-}$ in FIG. 3). In addition, the "second search strategy" and the "second action guideline" are also input from the second module mod2 to the third module mod3 for each second operation period $T_2$ (see the arrow $D_{2+}$ in FIG. 3).

In addition, if there is no input signal from the third module mod3 at the start time of the current cycle of the second module mod2, the second action search processing is performed by using the input signal from the third module mod3 at the start time of a recent past cycle of the second module mod2.

The current state or the latest predicted state of the robot R in the nearest future according to the current state are input from the second module mod2 to the third module mod3 for each third operation period $T_3$ (see the arrow $D_{3+}$ in FIG. 3). Moreover, a "second search strategy (including a second action reserve)" obtained by performing second action search processing is input from the second module mod2 to the third module mod3 for each third operation period $T_3$ (see the arrow $D_{3+}$ in FIG. 3).

According to the input signals, the third module mod3 performs "third action search processing" for each third operation period $T_3$. A "third action strategy" and a "third action guideline" obtained thereby are input from the third module mod3 to the second module mod2 for each third operation period $T_3$ as described above (see the arrow $D_{3-}$ in FIG. 3).

According to the input signal (see the arrow $D_{1-}$ in FIG. 3) from the first module mod1 for each first operation period $T_1$, the control module mod0 sequentially generates a command signal. Further, this command signal is transmitted from the control module mod0 to the actuators 2, by which the actuators 2 is driven according to the command signal. As a result, the robot R acts according to the latest first action guideline.

(Cooperative Processing of Parallel Modules)

The following describes the procedure for parallel processing performed by the modules immediately after an occurrence of a disturbance.

Consideration will be given to a case where the "current state" of the robot R affected by the disturbance is input from the control module mod0 to the first module mod1 for the first time at time $t=t_0$ (see the arrow $D_{1+}(t_0)$ in FIG. 5).

Figure 5:
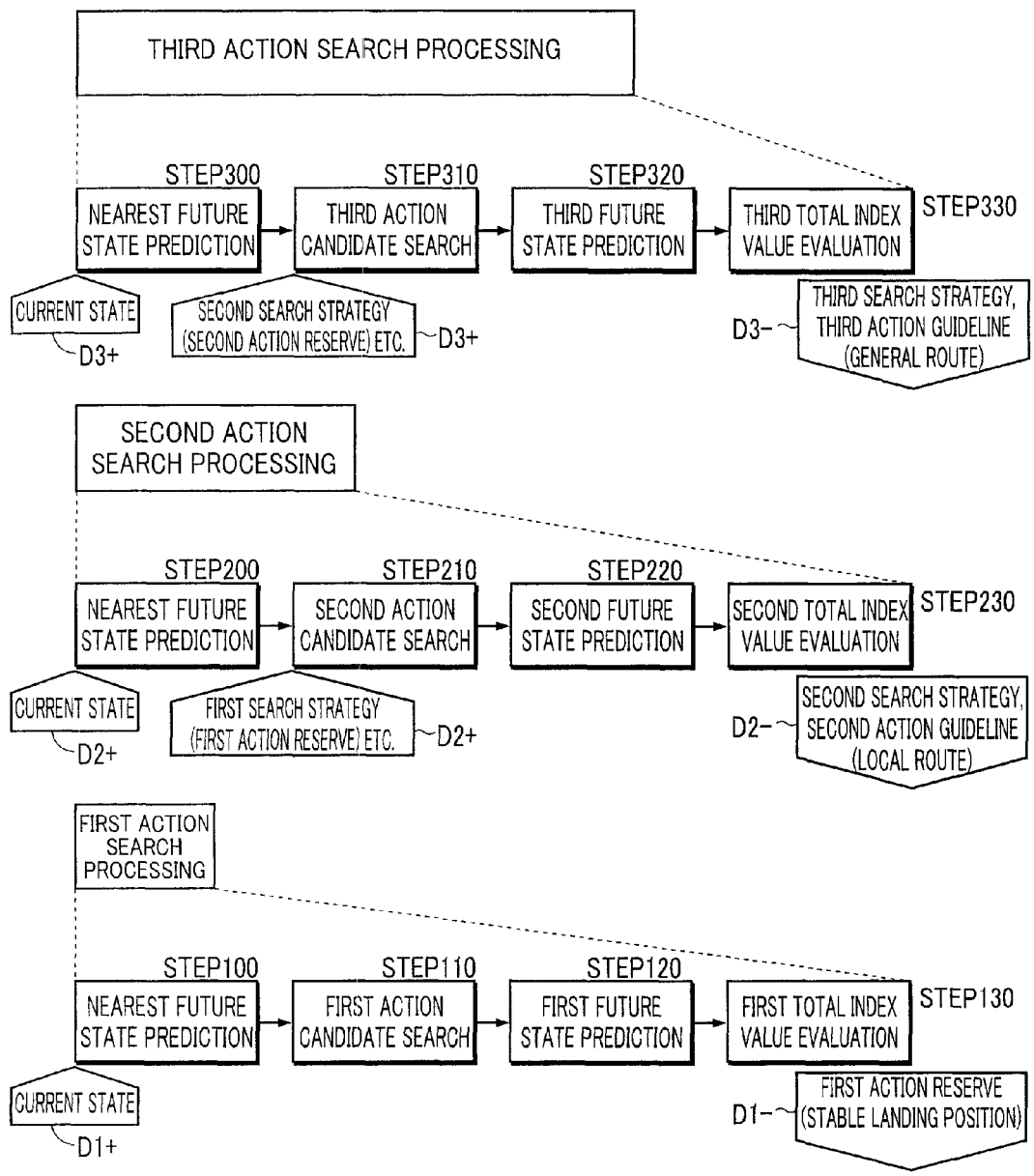
FIG. 5 is an explanatory diagram of an action search method using respective modules.

First, the first module mod1 performs the "first action search processing", by which the first module mod1 outputs the "first action guideline (=first action reserve)" to the control module mod) at time $t=t_1(=t_0+T_1)$ (see the arrow $D_{1+}(t_1)$ in FIG. 5). The operation of the actuators 2 is controlled according to the output, thereby enabling the robot R to act so as to match with the first action purpose (=causing the robot R to stabilize the posture) with taking into consideration the current state affected by the disturbance.

Moreover, at time $t=t_1$, the "first search strategy" is output from the first module mod1 to the second module mod2 (see the arrow $D_{2+}(t_1)$ in FIG. 5). Further, the second module mod2 performs the "second action search processing," by which the "second search strategy (including the second action guideline)" is output from the second module mod2 to the first module mod1 at time $t=t_0+T_1+T_2$ (see the arrow $D_{2-}(t_0+T_1+T_2)$ in FIG. 5).

Then, the first module mod1 performs the "first action search processing," by which the "first action guideline" is output from the first module mod1 to the control module mod0 at time $t=t_2(=t_0+T_2+2T_1)$ (see the arrow $D_{1+}(t_2)$ in FIG. 5). The operation of the actuators 2 is controlled according to the output, thereby enabling the robot R to act so as to match with the first action purpose and the second action purpose (=causing the robot R to prevent contact with an object) with taking into consideration the current state affected by the disturbance.

Moreover, at time $t=t_0+T_1+T_2$, the "second search strategy (including the second action reserve)" is output from the second module mod2 to the third module mod3 (see the arrow $D_{3+}(t_0+T_1+T_2)$ in FIG. 5). Further, the third module mod3 performs the "third action search processing," by which the "third search strategy (including the third action guideline)" is output from the third module mod3 to the second module mod2 at time $t=t_0+T_1+T_2+T_3$ (see the arrow $D_{3-}(t_0+T_1+T_2+T_3)$ in FIG. 5).

Furthermore, the second module mod2 performs the "second action search processing," by which the "second search strategy (including the second action guideline)" is output from the second module mod2 to the first module mod1 at time $t=t_0+T_1+2T_2+T_3$ (see the arrow $D_{2-}(t_0+T_1+2T_2+T_3)$ in FIG. 5).

Then, the first module mod1 performs the "first action search processing," by which the "first action guideline" is output from the first module mod1 to the control module mod0 at time $t=t_3(t_0+2T_1+2T_2+T_3$ (see the arrow $D_{1+}(t_3)$ in FIG. 5). The operation of the actuators 2 is controlled according to the output, thereby enabling the robot R to act so as to match with the first action purpose, the second action purpose, and the third action purpose (=causing the robot R to move to a target position) with taking into consideration the current state affected by the disturbance.

The above cooperative processing of the first module mod1, the second module mod2, and the third module mod3 connected in parallel enables the actions of the robot R to be controlled so as to match with all of the first action purpose, the second action purpose, and the third action purpose with taking the disturbance into consideration within the time of about $2T_1+2T_2+T_3$ from the occurrence of the disturbance. For example, if $T_1=T$, $T_2=2T$, and $T_3=4T$, it is possible to control the robot R to act so as to match with all of the plurality of purposes with taking the disturbance into consideration within the time of about 10T from the occurrence of the disturbance.

(Contents of Each Action Search Processing)

The following describes the details of the "first action search processing" performed by the first module mod1, the "second action search processing" performed by the second module mod2, and the "third action search processing" performed by the third module mod3.

(Procedure for First Action Search Processing)

First, the nearest future state of the robot R is predicted according to a behavior prediction model which represents the behavior of the robot R on the basis of the current state (step 100 in FIG. 5). This enables the prediction of, for example, a landing position where the robot R takes a step forward from the current position.

In addition, a plurality of first action candidates $\{a_{i1}|i_1=1, 2,\ldots,n_1\}$ of the robot R are searched for according to the first search strategy and the second search strategy (see the arrow $D_{2-}$ in FIG. 3) (step 110 in FIG. 5). Specifically, the first action candidates $a_{i1}$ are searched for according to a generation change method of an evolutionary search based on the evaluation result of first total fitness $f_1$ and the evaluation result of second total fitness $f_2$. This search method will be described later.

This causes a landing position $pos(a_{i1}; k_1)$ ($k_1=1$ to $q_1$), which determines a gait over a first specified number of steps $q_1$ (for example, $q_1=2$), to be searched for as the first action candidates $a_{i1}$, for example, from a predicted landing position which is one step ahead of the robot R. The term "gait" means a repeated pattern of legged locomotion focusing on the landing timing.

Furthermore, the plurality of first future states $\{s_{i1}|i_1=1, 2,\ldots,n_1\}$ of the robot R are predicted according to a first state prediction model on the basis of each of the plurality of first action candidates $a_{i1}$ (step 120 in FIG. 5). Thereby, for example, a zero moment point (ZMP) of the robot R at the time point when the robot R moves by the first specified number of steps $q_1$ according to the first action candidates $a_{i1}$ from the predicted landing position one step ahead of the robot R is predicted as the first future state $s_{i1}$.

Then, the first total fitness $f_1(a_{i1})$ is evaluated according to the following procedure with respect to each of the plurality of first action candidates $a_{i1}$ (step 130 in FIG. 5).

Figure 6:
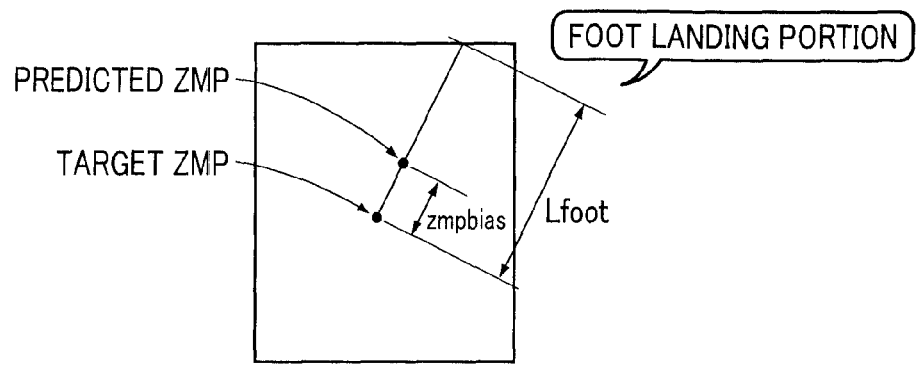
FIG. 6 is an explanatory diagram of a first fitness evaluation method.
Figure 6:
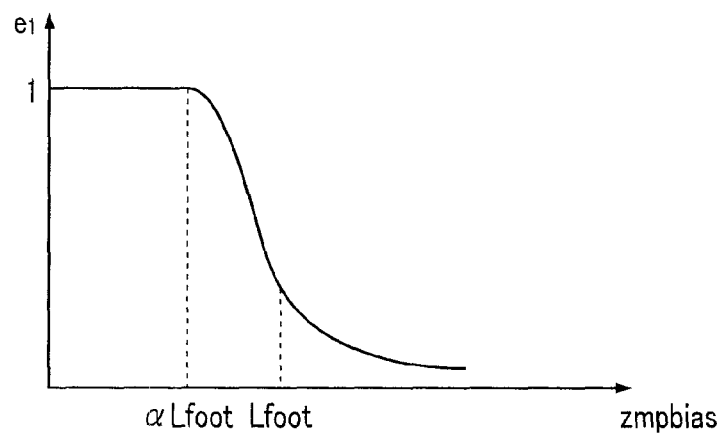
Figure 6:
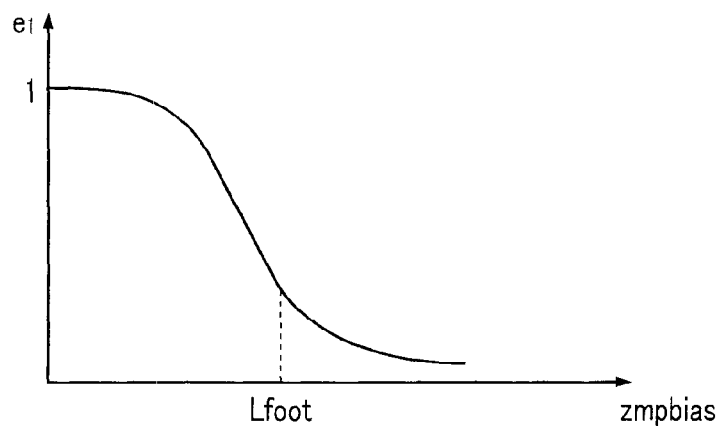

First, a first fitness $e_1(a_{i1})$ which represents the fitness in view of the first action purpose is evaluated on the basis of the first future state $s_{i1}$. The first fitness $e_1(a_{i1})$ is calculated according to an evaluation equation (111) whose variation characteristics are shown in FIG. 6(b), for example, on the basis of a bias $zmp_{bias}(a_{i1})$ from the target ZMP of the predicted ZMP shown in FIG. 6(a) and a distance $L_{foot}$ between the target ZMP and an edge of the foot B5 with respect to an azimuth toward the predicted ZMP from the target ZMP. The position of the target ZMP corresponds to a reference point defined in a state space adequate for the first purpose. The bias $zmp_{bias}$ from the target ZMP of the predicted ZMP corresponds to a divergence from the reference point. For example, the center position of the landing surface (for example, having a rectangular shape) of the foot B5 is defined as the target ZMP.

$$e_1(a_{i1})=1(\text{If}\quad zmp_{bias}(a_{i1})\le\alpha L_{foot}(0<\alpha<1)),\quad \exp(-((zmp_{bias}(a_{i1})-\alpha L_{foot})/L_{foot})^2)(\text{If } \alpha L_{foot}<zmp_{bias}(a_{i1})) \quad (111)$$

As apparent from the evaluation equation (111), if the distance between the predicted ZMP and the target ZMP of the robot R is equal to or less than a first threshold $\alpha L_{foot}$, in other words, in the case of the first action candidate $a_{i1}$ which is predicted to cause the posture of the robot R to be stable with a certain or higher degree of likelihood, the first fitness $e_1(a_{i1})$ is evaluated at a fixed value (=1). On the other hand, as the predicted ZMP of the robot R is more distant from the target ZMP so as to exceed the first threshold $\alpha L_{foot}$, in other words, as the first action candidate $a_{i1}$ is more likely to cause the posture of the robot R to be unstable, the first fitness $e_1(a_{i1})$ is evaluated lower.

In addition, the first fitness $e_1(a_{i1})$ may be calculated according to an evaluation equation (112) whose variation characteristics are shown in FIG. 6(c).

$$e_1(a_{i1})=\exp(-(zmp_{bias}(a_{i1})/L_{foot})^2) \quad (112)$$

As apparent from the evaluation equation (112), as the predicted ZMP of the robot R is nearer the target ZMP, in other words, as the first action candidate $a_{i1}$ is more likely to cause the posture of the robot R to be stable, the first fitness $e_1(a_{i1})$ is evaluated higher.

Furthermore, an estimated value (second estimated fitness) $e_2\hat{\ }(a_{i1})$ of second fitness $e_2(a_{i1})$ is evaluated on the basis of the second action guideline (see the arrow $D_{2-}$ in FIG. 3) received from the second module mod2 with respect to each of the plurality of first action candidates $a_{i1}$. The second estimated fitness $e_2\hat{\ }(a_{i1})$ is calculated according to an evaluation equation (120), for example, on the basis of the landing position $pos(a_{i1}; k_1)$ of the robot R, a distance $pos_{err}(a_{i1}; k_1)$ from a local route as the second action guideline, and a step length (maximum step length) $L_{step}$ of the robot R.

$$e_2\hat{\ }(a_{i1})=\Pi_{k1=1-q1}\exp(-pos_{err}(a_{i1}; k_1)/L_{step}) \quad (120)$$

As apparent from the evaluation equation (120), as the landing position $pos(a_{i1}; k_1)$ of the robot R is nearer the local route, in other words, as the first action candidate $a_{i1}$ is predicted to be more likely to cause the robot R to prevent contact with an object, the second estimated fitness) $e_2\hat{\ }(a_{i1})$ is evaluated higher.

In addition, if the second action purpose is to "cause the robot R to prevent contact with an object while maintaining the relative posture of the robot R to the object at a target relative posture," the second estimated fitness $e_2\hat{\ }(a_{i1})$ may be defined so as to be evaluated higher as the deviation (relative posture deviation) between the relative posture to the local route (for example, identified by the relative azimuth of the base B0 to the local route) of the robot R determined according to the gait as the first action candidate $a_{i1}$ and the target relative posture is smaller (see the evaluation equation (120)). This second action purpose is significant in terms of preventing contact with the robot R caused by an unexpected motion of a human being by causing the human being as an object to visually identify the posture of the robot R and to predict the behavior of the robot R on the basis of the posture.

Then, the first total fitness $f_1(a_{i1})$ is evaluated according to an evaluation equation (141) or (142) on the basis of the first fitness $e_1(a_{i1})$ and the second estimated fitness) $e_2\hat{}(a_{i1})$.

$$f_1(a_{i1}) = e_1(a_{i1})(e_2\hat{}(a_{i1})+1) \tag{141}$$

$$f_1 = w_1 e_1(w_2 e_2\hat{} + 1) \tag{142}$$

In the above, "$w_2$" and "$w_1(=(w_2+1)^{-1})$" are weighting factors.

An evaluation result of the first total fitness $f_1(a_{i1})$ is defined as a "first search strategy" having convergence and diversity for searching for each of the first action candidates $a_{i1}$ and second action candidates $a_{i2}$. The first search strategy includes the "first action reserve" as one first action candidate $a_{i1}$ having the highest evaluation of the first total fitness $f_1(a_{i1})$. The first action reserve may be the same as the first action guideline.

As apparent from the evaluation equations (141) and (142), the first fitness $e_1(a_{i1})$ in contribution to the first total fitness $f_1(a_{i1})$ is higher than the second estimated fitness $e_2\hat{}(a_{i1})$. For example, if the first fitness $e_1(a_{i1})$ approaches zero, the first total fitness $f_1(a_{i1})$ also approaches zero independently of the level of the second estimated fitness $e_2\hat{}(a_{i1})$. On the other hand, even if the second estimated fitness $e_2\hat{}(a_{i1})$ approaches zero, the first total fitness $f_1(a_{i1})$ approaches the first fitness $e_1(a_{i1})$, instead of zero, by which the level of the first fitness $e_1(a_{i1})$ is directly reflected on the first total fitness $f_1(a_{i1})$.

In the above, the second fitness $e_2(a_{i1})$ is not used, but the second estimated fitness $e_2\hat{}(a_{i1})$, which is an estimated value of the second fitness $e_2(a_{i1})$, is used in order to define the first search strategy taking into account not only the second action purpose of the second module mod2 (the module one order lower than the first module mod1), but also the third action purpose of the third module mod3 (the module two orders lower than the first module mod1).

In other words, the fitness of each of the first action candidates $a_{i1}$ to the second action purpose is evaluated with reference to the local route as the second action guideline as described above (see the evaluation equation (120)). On the other hand, the second action guideline is searched for by the second module mod2 with the third action guideline reflected on the second action guideline as described above. Accordingly, the fitness of the first action candidate $a_{i1}$ to the third action purpose is evaluated indirectly by the calculation of the second estimated fitness $e_2\hat{}(a_{i1})$. Then, the first total fitness $f_1(a_{i1})$ is evaluated on the basis of the second estimated fitness $e_2\hat{}(a_{i1})$ (see the evaluation equations (141) and (142)), by which the first search strategy as the evaluation result is able to reflect not only the second action purpose directly, but also the third action purpose indirectly.

(Procedure for Second Action Search Processing)

First, the nearest future state of the robot R is predicted according to a behavior prediction model which represents the behavior of the robot R on the basis of the current state (step 200 in FIG. 5). This enables the prediction of, for example, a landing position where the robot R takes a step forward from the current position. It is to be noted that the nearest future state of the robot R predicted by the first module mod1 may be output from the first module mod1 to the second module mod2 (see the arrow $D_{2+}$ in FIG. 3).

In addition, a plurality of second action candidates $\{a_{i2} | i_2=1, 2, \ldots, n_2\}$ of the robot R are searched for according to the first search strategy, the second search strategy, and the third search strategy (see step 210 in FIG. 5). Specifically, the second action candidates $a_{i2}$ are searched for according to a generation change method of individuals based on the evaluation result of the first total fitness $f_1$, the evaluation result of the second total fitness $f_2$, and the evaluation result of the third total fitness $f_3$. This search method will be described later.

Figure 7:
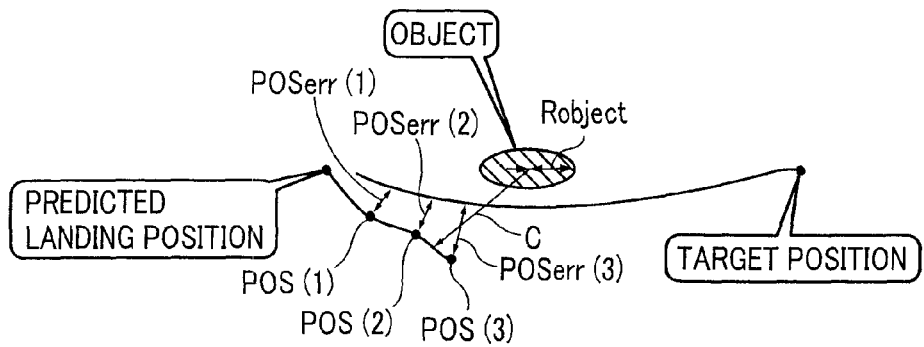
FIG. 7 is an explanatory diagram of a second fitness evaluation method.
Figure 7:
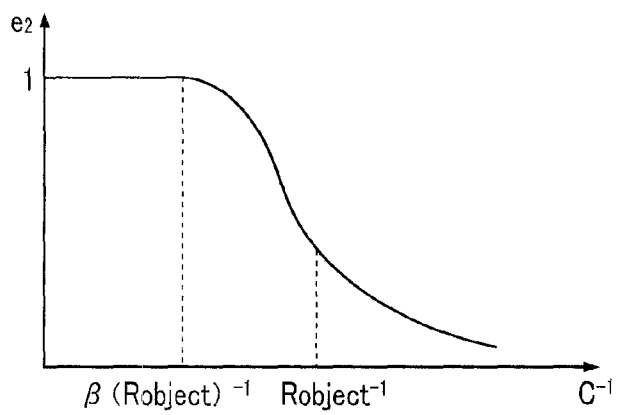
Figure 7:
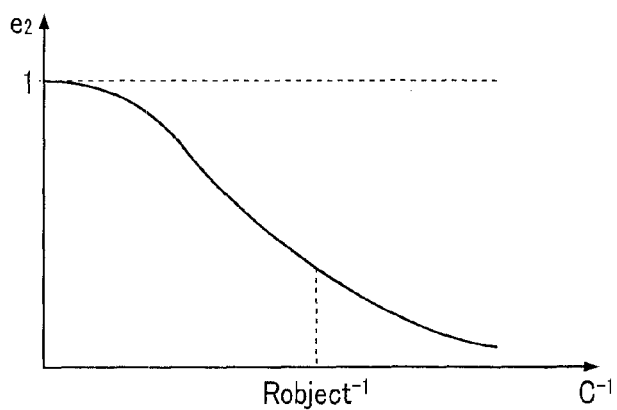

Thereby, for example, as shown in FIG. 7(a), a local route including a landing position $pos(a_{i2}; k_2)$ ($k_2=1$ to $q_2$) of the robot R which determines a gait over a second specified number of steps $q_2$ (for example, $q_2=3<q_1$) is searched for as the second action candidates $a_{i2}$. For example, the landing position which is one step ahead of the robot R predicted as described above is assumed to be the starting point of the local route. In addition, with the landing position which is one step ahead of the robot R as the origin, the starting point of the local route may be assumed to be a predicted landing position of the robot R at the time point after the completion of a gait over the first specified number of steps $q_1$ as the first action reserve (see the arrow $D_{2+}$ in FIG. 3). The term "local route" means a route for use in preventing the robot R from contacting an object, which is determined on the basis of the position or the like of the object as an external state.

Furthermore, the plurality of second future states $\{s_{i2} | i_2=1, 2, \ldots, n_2\}$ of the robot R are predicted according to a second state prediction model on the basis of each of the plurality of second action candidates $a_{i2}$ (step 220 in FIG. 5). Thereby, for example, the shortest distance $C(a_{i2})$ between the robot R and the object in the case where the robot R moves along the local route as the second action candidate $a_{i2}$ is predicted as the second future state $s_{i2}$ (see FIG. 7(a)).

Then, the second total fitness $f_2(a_{i2})$ is evaluated according to the following procedure with respect to each of the plurality of second action candidates $a_{i2}$ (step 230 in FIG. 5).

First, a second fitness $e_2(a_{i2})$ which represents the fitness in view of the second action purpose is evaluated on the basis of the second future state $s_{i2}$. The second fitness $e_2(a_{i2})$ is calculated according to an evaluation equation (221) whose variation characteristics are shown in FIG. 7(b), for example, on the basis of the shortest distance $C(a_{i2})$ between the local route and the object shown in FIG. 7(a) and an object size $R_{object}$. The local route (line segment) infinitely or extremely largely distant from the center position of the object corresponds to a reference point defined in a state space adequate for the second purpose. The reciprocal $C^{-1}$ of the shortest distance between the local route and the center position of the object corresponds to the divergence from the reference point. For example, the radius of a circle on a plane, to which the outline of the object is approximated, is defined as the object size $R_{object}$.

$$e_2(a_{i2}) = 1(\text{If } C^{-1}(a_{i2}) \leq \beta R_{object}^{-1}(0<\beta<1)), \exp(-(R_{object}(C^{-1}(a_{i2})-\beta R_{object}^{-1}))^2)(\text{If } \beta R_{object}^{-1} < C^{-1}(a_{i2})) \tag{221}$$

As apparent from the evaluation equation (221), if the reciprocal $C^{-1}$ of the minimum distance between the local route of the robot R and the object is equal to or less than a second threshold $\beta R_{object}^{-1}$, in other words, in the case of the second action candidate $a_{i2}$ which is predicted to cause the robot R to prevent contact with the object with a certain or higher degree of likelihood, the second fitness $e_2(a_{i2})$ is evaluated at a fixed value (=1). On the other hand, as the reciprocal $C^{-1}$ of the minimum distance between the local route of the robot R and the object is higher so as to exceed the second threshold $\beta R_{object}^{-1}$, in other words, as the second action candidate $a_{i2}$ is more likely to cause the robot R to contact the object, the second fitness $e_2(a_{i2})$ is evaluated lower.

In addition, the second fitness $e_2(a_{i2})$ may be calculated according to an evaluation equation (222) whose variation characteristics are shown in FIG. 7(c).

$$e_2(a_{i2}) = \exp(-(R_{object}/C(a_{i2}))^2) \tag{222}$$

As apparent from the evaluation equation (222), as the reciprocal $C^{-1}$ of the minimum distance between the local route of the robot R and the object is smaller, in other words, as the second action candidate $a_{i2}$ is more likely to cause the robot R to prevent contact with the object, the second fitness $e_2(a_{i2})$ is evaluated higher.

In addition, if the second action purpose is to "cause the robot R to prevent contact with an object while maintaining the relative posture of the robot R to the object at a target relative posture," the second fitness $e_2(a_{i2})$ may be defined so as to be evaluated higher as the deviation (relative posture deviation) between the relative posture (for example, identified by the relative azimuth of the base B0 to the local route) of the robot to the posture of the local route as the second action candidate $a_{i2}$ and the target relative posture is smaller (see the evaluation equations (221) and (222)).

Furthermore, an estimated value (third estimated fitness) $e_3\hat{}(a_{i2})$ of third fitness $e_3(a_{i2})$ is evaluated on the basis of the third action guideline (see the arrow $D_{3\_}$ in FIG. 3) received from the third module mod3 with respect to each of the plurality of second action candidates $a_{i2}$. The third estimated fitness $e_3\hat{}(a_{i2})$ is calculated according to an evaluation equation (230), for example, on the basis of the landing position $pos(a_{i2}; k_2)$ of the robot R, a distance $pos_{err}(a_{i2}; k_2)$ from a general route as the third action guideline, and a step length (maximum step length) $L_{step}$ of the robot R.

$$e_3\hat{}(a_{i2}) = \Pi_{k2=2-q2} \exp(-pos_{err}(a_{i2}; k_2)/L_{step}) \quad (230)$$

As apparent from the evaluation equation (230), as the landing position $pos(a_{i2}; k_2)$ of the robot R is nearer the general route, in other words, as the second action candidate $a_{i2}$ is predicted to be more likely to cause the robot R to move according to the general route to reach the target position, the third estimated fitness) $e_3\hat{}(a_{i2})$ is evaluated higher.

In addition, if the third action purpose is to "cause the robot R to reach a target position with a target posture," the third estimated fitness $e_3\hat{}(a_{i2})$ may be defined so as to be evaluated higher as the deviation (posture deviation) between the posture (for example, identified by the azimuth of the base B0) of the robot R determined according to the local route as the second action candidate $a_{i2}$ and the posture of the general route is smaller (see the evaluation equation (230)). This third action purpose is significant in terms of causing the robot R to perform works which vary in difficulty level according to the posture such as holding an object when or after the robot R reaches the target position.

Then, the second total fitness $f_2(a_{i2})$ is evaluated according to an evaluation equation (241) or (242) on the basis of the first fitness $e_1(a_{i2})$ evaluated by the first module mod1, in addition to the second fitness $e_2(a_{i2})$ and the third estimated fitness $e_3\hat{}(a_{i2})$.

$$f_2(a_{i1}) = e_2(a_{i2})(e_1(a_{i2})(e_3\hat{}(a_{i2})+1)+1) \quad (241)$$

$$f_2 = w_2 e_2(w_1 e_1(w_3 e_3\hat{}+1)+1) \quad (242)$$

In the above, "$w_1$," "$w_3$," and "$w_2(=\{w_1(w_3+1)+1\}^{-1}$" are weighting factors.

An evaluation result of the second total fitness $f_2(a_{i2})$ is defined as a "second search strategy" having convergence and diversity for searching for each of the first action candidates $a_{i1}$, the second action candidates $a_{i2}$, and third action candidates $a_{i3}$. The second search strategy includes the "second action reserve" as one second action candidate $a_{i2}$ having the highest evaluation of the second total fitness $f_2(a_{i2})$. The second action reserve may be the same as the second action guideline.

As apparent from the evaluation equations (241) and (242), the second fitness $e_2(a_{i2})$ in contribution to the second total fitness $f_2(a_{i2})$ is higher than each of the first fitness $e_1(a_{i2})$ and the third estimated fitness $e_3\hat{}(a_{i2})$. For example, if the second fitness $e_2(a_{i2})$ approaches zero, the second total fitness $f_2(a_{i2})$ also approaches zero independently of the level of the first fitness $e_1(a_{i2})$ and the third estimated fitness $e_3\hat{}(a_{i2})$. On the other hand, even if the first fitness $e_1(a_{i2})$ and the third estimated fitness $e_3\hat{}(a_{i2})$ approach zero, the second total fitness $f_2(a_{i2})$ approaches the second fitness $e_2(a_{i2})$, instead of zero, by which the level of the second fitness $e_2(a_{i2})$ is directly reflected on the second total fitness $f_2(a_{i2})$.

Moreover, the first fitness $e_1(a_{i2})$ in contribution to the second total fitness $f_2(a_{i2})$ is higher than the third estimated fitness $e_3\hat{}(a_{i2})$. For example, if the first fitness $e_1(a_{i2})$ approaches zero, the second total fitness $f_2(a_{i2})$ decreases independently of the level of the third estimated fitness $e_3\hat{}(a_{i2})$. On the other hand, even if the third estimated fitness $e_3\hat{}(a_{i3})$ approaches zero, the second total fitness $f_2(a_{i2})$ approaches $e_2(a_{i2}) \cdot e_1(a_{i1})$, by which the level of the first fitness $e_1(a_{i1})$ is directly reflected on the third estimated fitness $e_3\hat{}(a_{i2})$.

In the above, the third fitness $e_3(a_{i2})$ is not used, but the third estimated fitness $e_3\hat{}(a_{i2})$, which is an estimated value of the third fitness $e_3(a_{i2})$, is used in order to define the second search strategy taking into account not only the third action purpose of the third module mod3 (the module one order lower than the second module mod2), but also a fourth action purpose (for example, a purpose of causing the robot R to move to a target position and then to move to a second target position) of a fourth module mod4 (the module two orders lower than the second module mod2) (if the fourth module exists, though it does not exist in this embodiment).

In other words, the fitness of each of the second action candidates $a_{i2}$ to the third action purpose is evaluated with reference to the general route as the third action guideline as described above (see the evaluation equation (230)). On the other hand, the third action guideline is able to be searched for by the third module mod3 with the fourth action guideline reflected on the third action guideline. Accordingly, the fitness of the second action candidate $a_{i2}$ to the fourth action purpose is evaluated indirectly by the calculation of the third estimated fitness $e_3\hat{}(a_{i2})$. Then, the second total fitness $f_2(a_{i2})$ is evaluated on the basis of the third estimated fitness $e_3\hat{}(a_{i2})$ (see the evaluation equations (241) and (242)), by which the second search strategy as the evaluation result is able to reflect not only the third action purpose directly, but also the fourth action purpose indirectly.

(Procedure for Third Action Search Processing)

First, the nearest future state of the robot R is predicted according to a behavior prediction model which represents the behavior of the robot R on the basis of the current state (step 300 in FIG. 5). This enables the prediction of, for example, a landing position where the robot R takes a step forward from the current position. It is to be noted that the nearest future state of the robot R predicted by the first module mod1 or the second module mod2 may be output from the second module mod2 to the third module mod3 (see the arrow $D_{3+}$ in FIG. 3).

In addition, a plurality of third action candidates $\{a_{i3}|i_3=1, 2, \ldots, n_3\}$ of the robot R are searched for according to the second search strategy and the third search strategy (see step 310 in FIG. 5). Specifically, the third action candidates $a_{i3}$ are searched for according to a generation change method of individuals based on the evaluation result of the second total fitness $f_2$ and the evaluation result of the third total fitness $f_3$. This method will be described later.

Figure 8:
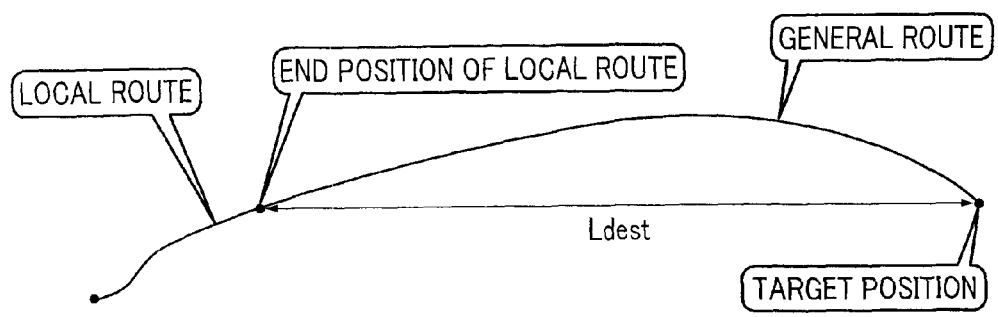
FIG. 8 is an explanatory diagram of a third fitness evaluation method.
Figure 8:
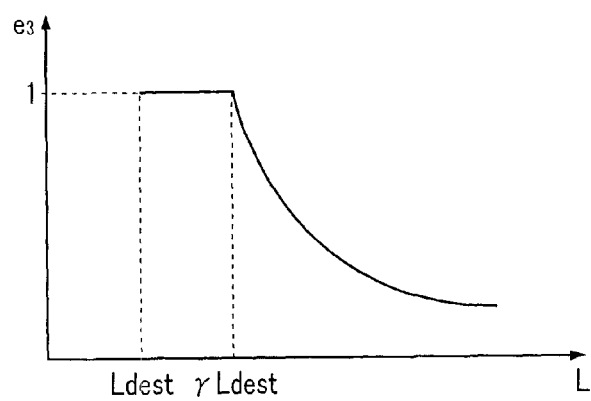
Figure 8:
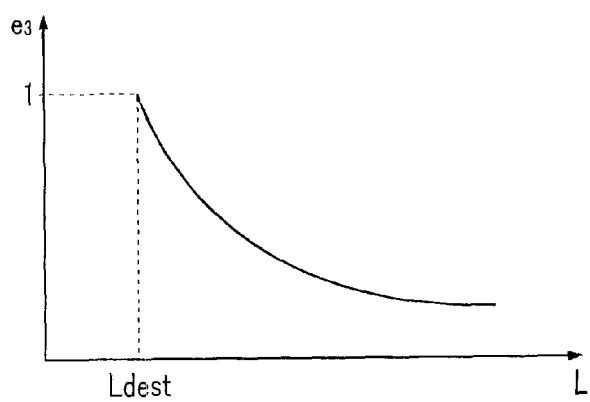

Thereby, for example, as shown in FIG. 8(a), a general route which determines a gait in which the robot R moves toward the target position is searched for as the third action candidates $a_{i3}$. For example, the landing position which is one step ahead of the robot R predicted as described above is assumed to be the starting point of the general route. In addition, the end point of the local route as the second action reserve (see the arrow $D_{3+}$ in FIG. 3) is assumed to be the starting point of the general route. The target position of the robot R may be input or transmitted to the control system from the outside of the robot R and may be calculated on the basis of the recognition result of the external state by the control system 1.

Furthermore, the plurality of third future states $\{s_{i3}|i_3=1, 2, \ldots, n_3\}$ of the robot R are predicted according to a third state prediction model on the basis of each of the plurality of third action candidates $a_{i3}$ (step 320 in FIG. 5). Thereby, for example, a moving distance $L(a_{i3})$ in the case where the robot R moves along the general route from the predicted landing position one step ahead of the robot R is predicted as the third future state $s_{i3}$.

Then, the third total fitness $f_3(a_{i3})$ is evaluated according to the following procedure with respect to each of the plurality of third action candidates $a_{i3}$ (step 330 in FIG. 5).

First, a third fitness $e_3(a_{i3})$ which represents the fitness in view of the third action purpose is evaluated on the basis of the third future state $s_{i3}$. The third fitness $e_3(a_{i3})$ is calculated according to an evaluation equation (331) whose variation characteristics are shown in FIG. 8(b), for example, on the basis of the predicted moving distance $L(a_{i3})$ of the robot R shown in FIG. 8(a) and a linear distance $L_{dest}$ between the starting point of the general route and the target position. The linear distance $L_{dest}$ corresponds to a reference point defined in a state space adequate for the third purpose. The deviation between the predicted moving distance L of the robot R and the linear distance $L_{dest}$ corresponds to the divergence from the reference point.

$$e_3(a_{i3})=1 (\text{If } L_{dest} \leq L(a_{i3}) \leq \gamma L_{dest}(1<\gamma)), \gamma L_{dest}/L(a_{i3}) (\text{If } \gamma L_{dest}<L(a_{i3})) \quad (331)$$

As apparent from the evaluation equation (331), if the predicted moving distance L of the robot R is equal to or less than a third threshold $\gamma L_{dest}$, in other words, in the case of the third action candidate $a_{i3}$ which is predicted to cause the moving distance until the robot R reaches the target position to be short to some extent, the third fitness $e_3(a_{i3})$ is evaluated at a fixed value (=1). On the other hand, as the predicted moving distance L of the robot R is longer so as to exceed a third threshold $\gamma L_{dest}$, in other words, as the third action candidate $a_{i3}$ is more likely to cause the moving distance until the robot R reaches the target position to be longer than a certain distance, the third fitness $e_3(a_{i3})$ is evaluated lower.

In addition, the third fitness $e_3(a_{i3})$ may be calculated according to an evaluation equation (332) whose variation characteristics are shown in FIG. 8(c).

$$e_3(a_{i3})=L_{dest}/L(a_{i3}) \quad (332)$$

As apparent from the evaluation equation (332), as the robot R moves closer to the target position linearly, in other words, as the third action candidate $a_{i3}$ is predicted to cause the moving distance L until the robot R reaches the target position to be shorter, the third fitness $e_3(a_{i3})$ is evaluated higher.

In addition, if the third action purpose is to "cause the robot R to reach a target position with a target posture," the third fitness $e_3(a_{i3})$ may be defined so as to be evaluated higher as the deviation (posture deviation) between the posture (for example, identified by the azimuth of the base B0) of the robot R in the target position which is determined according to the general route as the third action candidate $a_{i3}$ and the target posture is smaller (see the evaluation equations (331) and (332)).

Furthermore, the third total fitness $f_3(a_{i3})$ is evaluated according to an evaluation equation (341) or (342) on the basis of the second fitness $e_2(a_{i3})$ evaluated by the second module mod2 in addition to the third fitness $e_3(a_{i3})$.

$$f_3(a_{i3})=e_3(a_{i3})(e_2(a_{i3})+1) \quad (341)$$

$$f_3=w_3e_3(w_2e_2+1) \quad (342)$$

In the above, "$w_2$" and "$w_3(=(w_2+1)^{-1})$" are weighting factors.

An evaluation result of the third total fitness $f_3(a_{i3})$ is defined as a "third search strategy" having convergence and diversity for searching for each of the second action candidates $a_{i2}$ and the third action candidates $a_{i3}$.

As apparent from the evaluation equations (341) and (342), the third fitness $e_3(a_{i3})$ in contribution to the third total fitness $f_3(a_{i3})$ is higher than the second fitness $e_2(a_{i3})$. For example, if the third fitness $e_3(a_{i3})$ approaches zero, the third total fitness $f_3(a_{i3})$ also approaches zero independently of the level of the second fitness $e_2(a_{i3})$. On the other hand, even if the second fitness $e_2(a_{i3})$ approaches zero, the third total fitness $f_3(a_{i3})$ approaches the third fitness $e_3(a_{i3})$, instead of zero, by which the level of the third fitness $e_3(a_{i3})$ is directly reflected on the third total fitness $f_3(a_{i3})$.

(Method of Searching for Action Candidates According to Search Strategy)

A method of searching for action candidates will be described below. As the search method, there is employed a method having "convergence" and "diversity." With the use of a method having "convergence," it is possible to search for an action candidate whose current evaluation is higher than the previous high evaluation of another action candidate in the vicinity thereof in a search range (which means a range in a space defined by action candidates). With the use of a method having "diversity," it is possible to search for an action candidate whose current evaluation is higher in a wide range without being too affected by the previous evaluation.

An evolutionary search method can be used as the method of searching for an action candidate having convergence and diversity.

Figure 9:
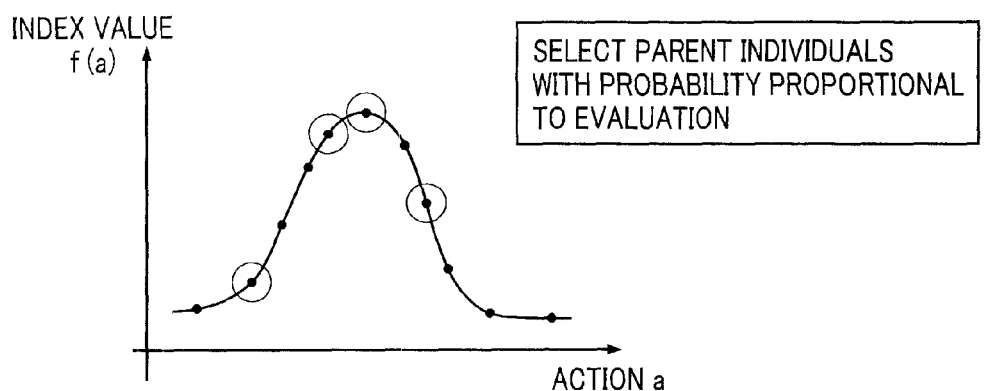
FIG. 9 is an explanatory diagram of the diversity and convergence of an action search method.
Figure 9:
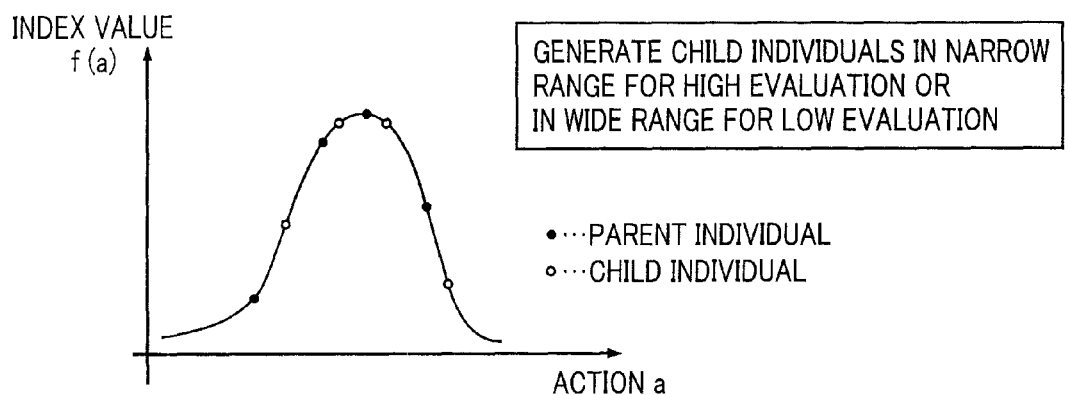

Specifically, first, parent individuals each enclosed by a circle are selected among a plurality of parent individuals (which correspond to action candidates a and are each represented by a mark "•") shown in FIG. 9(a). The choice probability is higher as the fitness f(a) (evaluated according to the evaluation curve represented by a solid line) is higher.

Then, as shown in FIG. 9(b), the parent individual having higher fitness f(a) is generated so that child individuals (represented by a mark "o") are distributed with higher probability in a relatively narrow range around the parent individual, as a result of adding relatively low noise to the parent individual (the noise is lower as the fitness f(a) is higher). On the other hand, the parent individual having lower fitness f(a) is generated so that child individuals are distributed with higher probability in a relatively wide range around the parent individual, as a result of adding relatively high noise to the parent individual (the noise is higher as the fitness f(a) is lower). In addition, individuals are generated irregularly, though not shown. The occupancy rate of the irregular individuals to all individuals is set to, for example, in the order of 0.30.

With the use of the generation change method as described above, individuals concentrate on a region having higher fitness f(a) as more generations are passed. Thereby, it is possible to adaptively obtain an action candidate a highly matching with the purpose mainly under the charge of the module.

Furthermore, to describe the diversity of the search method, two modules A and B will be considered. The module A is adapted to evaluate the fitness $f_A(a)$ representing how the action candidate a matches with the purpose, to set a search strategy according to a result of the evaluation, and to output the search strategy to the module B. The module B is adapted to receive the search strategy from the module A and to search for an action candidate a having high fitness $f_B(a)$ representing how the action candidate a matches with the purpose.

First, consideration will be given to a case where the module A sets "one action candidate $a_1$" whose fitness $f_A(a)$ represents the maximum value as a search strategy as shown in the upper part of FIG. 10(a). In this case, for example, as shown in the lower part of FIG. 10(a), the module B searches for an action candidate $a_{2-}$ whose fitness $f_B(a)$ represents the local maximum value with the action candidate $a_1$ as the search strategy as the origin. This solution, however, is likely to be other than the optimal solution having the highest fitness $f_B(a)$, but be only a local solution.

Therefore, as shown in the upper part of FIG. 10(b), the module A sets "the peripheral range of one action candidate $a_1$" whose fitness $f_A(a)$ represents the maximum value (or the local maximum value) as a search strategy. In response to this, for example, as shown in the lower part of FIG. 10(b), the module B searches for an action candidate $a_{2+}$ ($\neq a_{2-}$) having the highest fitness $f_B(a)$ in a range as the search strategy. As a result of expanding the search range as described above, the optimal solution is more likely to be obtained.

Figure 11:
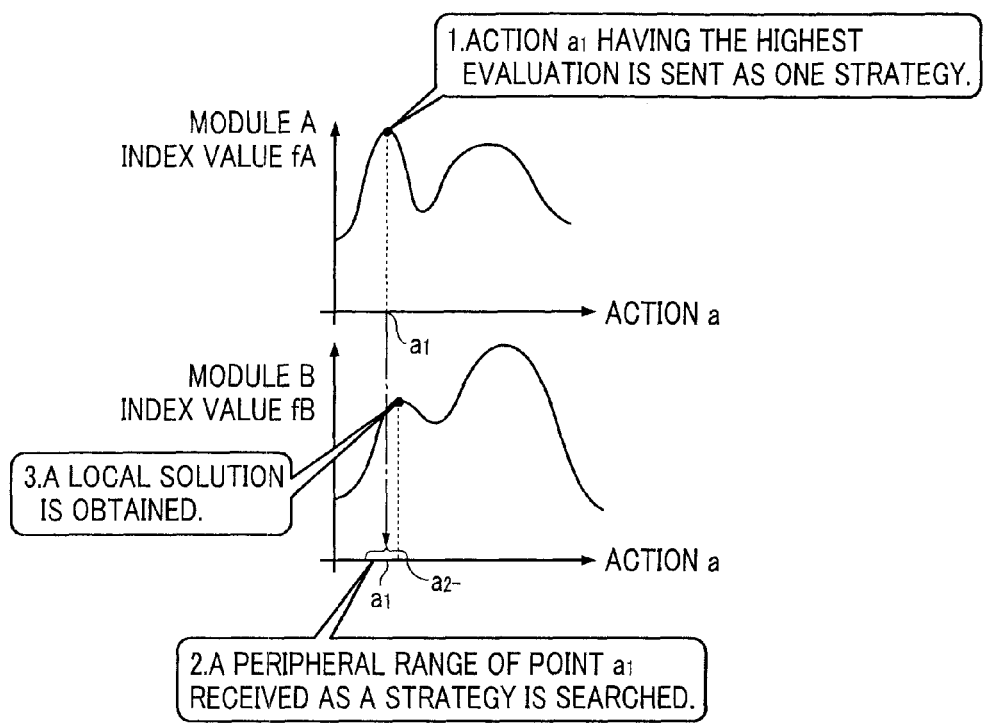
FIG. 11 is an explanatory diagram of the diversity of the action search method.
Figure 11:
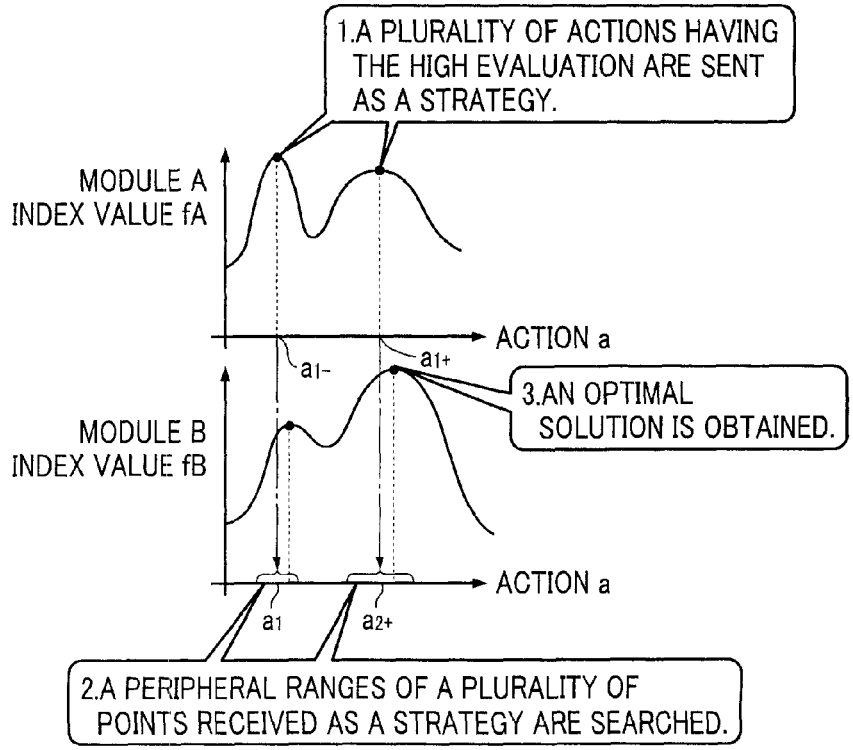

In addition, consideration will be given to a case where the module A sets "one action candidate $a_1$" whose fitness $f_A(a)$ represents the maximum value as a search strategy as shown in the upper part of FIG. 11(a). In this case, for example, as shown in the lower part of FIG. 11(a), the module B searches for an action candidate whose fitness $f_B(a)$ represents the local maximum value in a single range around one action candidate $a_1$ as the search strategy. This solution, however, is likely to be other than the optimal solution having the highest fitness $f_B(a)$, but be only a local solution.

Therefore, as shown in the upper part of FIG. 11(b), the module A sets "a plurality of action candidates $a_{1-}$ and $a_{1+}$" whose fitness $f_A(a)$ represents the local maximum value as a search strategy. In response to this, for example, as shown in the lower part of FIG. 11(b), the module B searches for an action candidate $a_{2+}$ ($\neq a_{2-}$) having the highest fitness $f_B(a)$ in each peripheral range of the plurality of action candidates $a_{1-}$ and $a_{1+}$ as search strategies. As a result of expanding the search range in this manner, the optimal solution is more likely to be obtained.

EMBODIMENT

The behavior states of the robot R, which are represented by the ZMP and the center-of-gravity location (represented by a double circle) of the robot R shown in the lower part of FIGS. 12(a) to 12(c), respectively, can be considered as a model of the behavior states of an inverted pendulum, which are represented by the landing position and the center-of-gravity location (represented by a double circle) of the inverted pendulum shown in the upper part of FIGS. 12(a) to 12(c), respectively.

Figure 13:
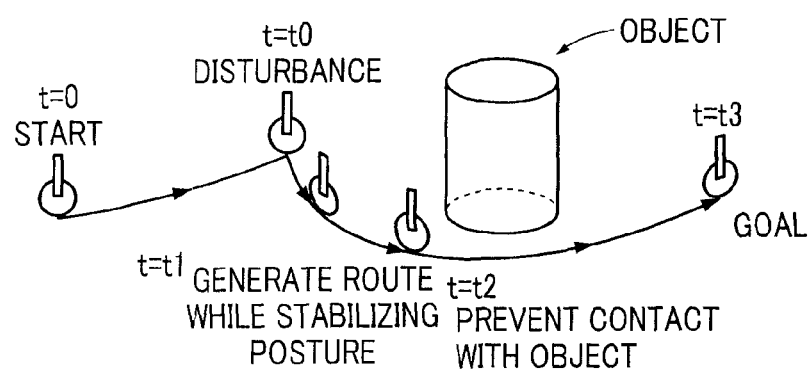
FIG. 13 is an explanatory diagram of experimental results with the inverted pendulum.
Figure 13:
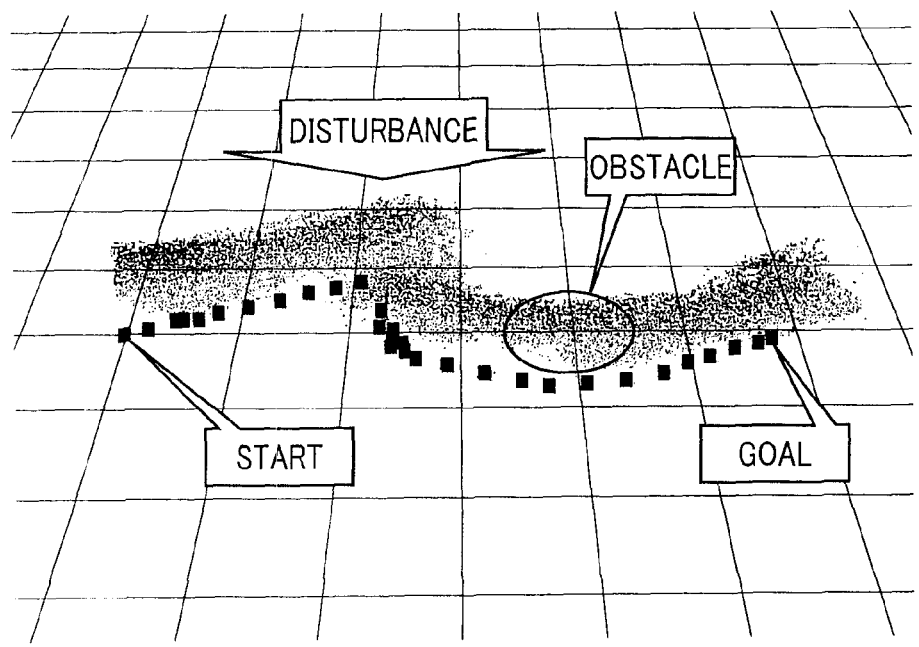

Therefore, an experiment was performed by moving the inverted pendulum while being suspended from above with its top freely displaceable. First, as shown in FIG. 13(a), the inverted pendulum is started to move from the starting position (time t=0) and thereafter a disturbance (a force received due to contact with an object) is given to the inverted pendulum (time t=$t_0$). The inverted pendulum moves along a new route (time t=$t_1$) while attempting to stabilize the posture in response to the disturbance, further moves while preventing contact with an object (time t=$t_2$), and reaches the target position (time t=$t_3$).

In the above, as shown in FIG. 13(b), calculation was made to search for discrete landing positions as first action candidates using an individual filter. The individuals are represented by individual points constituting a cloud-shaped mass, which is located upper than the ground provided with squares, and the height from the ground represents the magnitude of the first total fitness $f_1$. In this case, the points vertically projected on the ground from the points arranged along the ridge of the cloud represent the landing positions as the first action reserve or the first action guideline.

Figure 14:
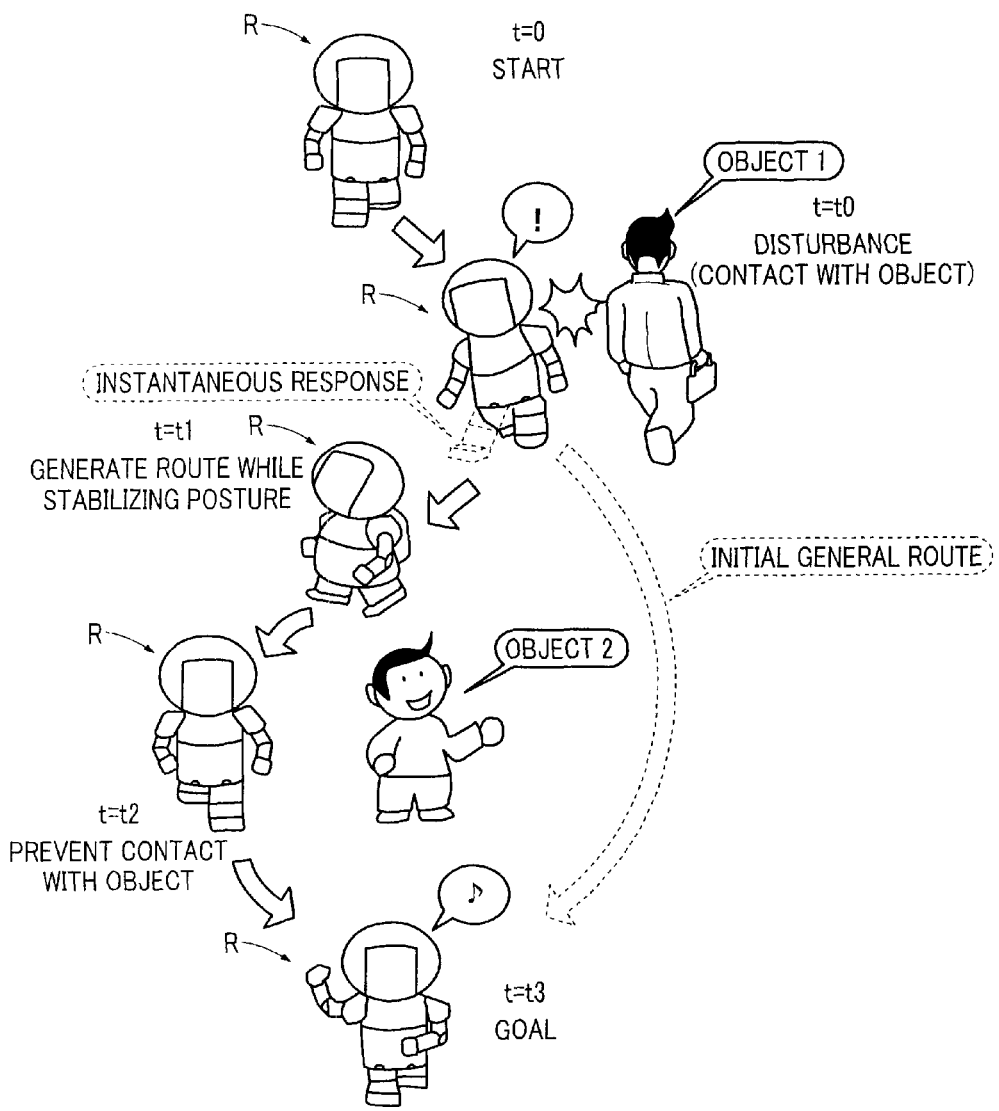
FIG. 14 is an explanatory diagram of the actions of the robot.

Since the behavior states of the robot R are modeled into the behavior states of the inverted pendulum as described above, it is possible to control the actions of the robot R by using the model. This enables the robot R to act in the same manner as the inverted pendulum as shown in FIG. 14. More specifically, first, the robot R is started to move from the starting position (time t=0), and then a disturbance is given to the robot R (time t=$t_0$). The robot R moves along a new route (time t=$t_1$) while attempting to stabilize the posture in response to the disturbance, further moves while preventing contact with an object (time t=$t_2$), and reaches the target position (time t=$t_3$).

(Operation and Effect of Robot R of the Present Invention and Control System Therefor)

According to the robot R implementing the above functions, action candidates of the robot R which is a controlled object are searched for, with each of a plurality of modules modi (i=1, 2, 3) allowed to give priority to the main purpose mainly under the charge of each module while taking into consideration sub-purposes mainly under the charge of other modules (see steps 110, 210, and 310 in FIG. 5). In this manner, it is possible to search for action candidates of the controlled object with the purposes loosely shared among different modules.

In addition, there are predicted a plurality of future states of the controlled object according to the searched action candidates, which follow the future state of the controlled object predicted by a high-order module (at least the control module mod0) (see steps 120, 220, and 320 in FIG. 5).

In addition, a high-order purpose mainly under the charge of a high-order module of a high frequency is given priority over a low-order purpose mainly under the charge of a low-order module of a low frequency to evaluate the total fitness to the main purpose mainly under the charge of the high-order module and the sub-purposes on the basis of the respective future states (see steps 130, 230, and 330 in FIG. 5). Thereby, the actions of the robot R are controlled with the high-order purpose mainly under the charge of the high-order module of a high frequency reflected in preference to the low-order purpose mainly under the charge of the low-order module of a low frequency.

Figure 4:
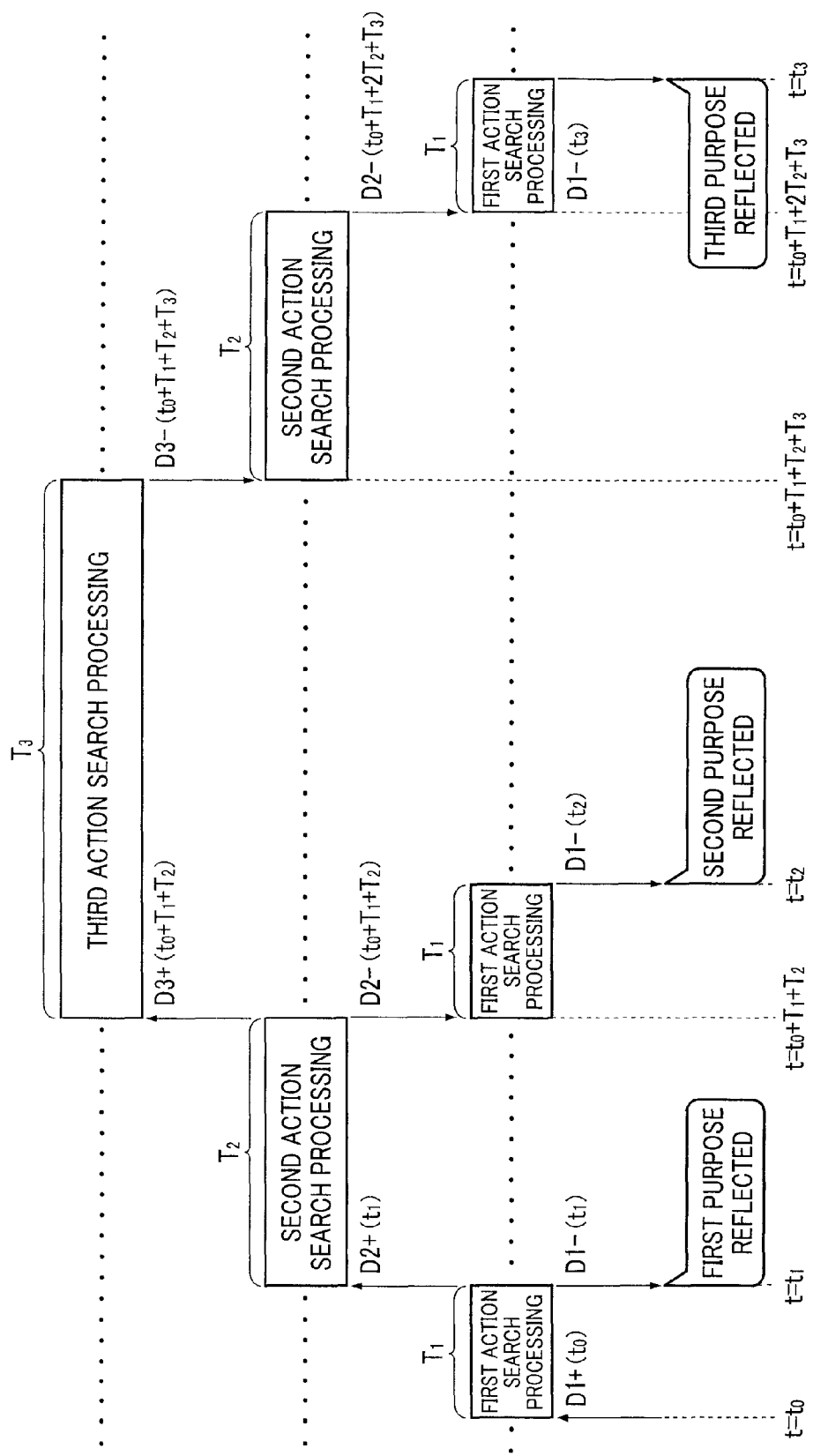
FIG. 4 is an explanatory diagram of cooperative processing of the parallel modules.

Therefore, in the case of a disturbance (see time t=t0 in FIG. 4), the high-order purpose mainly under the charge of the high-order module fast in response is reflected on the action form of the controlled object initially so as to reduce the effect of the disturbance quickly (see time t=$t_1$ in FIG. 4). Furthermore, low-order purposes mainly under the charge of the low-order modules slow in response are reflected on the action forms of the controlled object with elapsed time so as to recover the action forms of the controlled object which match with all of the plurality of purposes (see time $t=t_2$ and $t=t_3$ in FIG. 4). This enables the robot R to act in an appropriate form in view of the action purposes of the robot R against a disturbance in an arbitrary form.

Particularly, the j-th fitness $e_j$ is evaluated at a fixed value "1" with respect to the j-th action candidate $a_{jk}$ whose divergence from the reference point defined according to the j-th purpose within the state space is within the j-th threshold among all j-th action candidates searched for by the j-th module (j=1, 2, 3 in the above embodiment), in other words, with respect to the j-th action candidate $a_{jk}$ included in the j-th specified action candidate group (see the equations (111), (221), and (331) and FIGS. 6(b), 7(b), and 8(b)). This constant value is not limited to "1," but an arbitrary value may be adopted. On the other hand, with respect to the j-th action candidate $a_{jk}$ not included in the j-th specified action candidate group, the j-th fitness $e_j$ is evaluated at a value lower than the fixed value. More specifically, in a space defined by a plurality of j-th action candidates (the j-th solution space), there are formed a region in which the j-th fitness $e_j$ is evaluated at the fixed value (flat region) and a region in which the j-th fitness $e_j$ is lower than the fixed value. The configuration is based on a concept that the j-th action candidate $a_{jk}$ matching with the j-th purpose to some extent may be considered to have approximately-equivalent j-th fitness.

With respect to a first solution space defined by $ZMP_{bias}$ determining the first action candidate, as shown in FIG. 6(b), the range of $0 \leq ZMP_{bias} \leq \alpha L_{foot}$ is defined as a flat region in which the first fitness $e_1$ is a fixed value "1" and the range of $\alpha L_{foot} < ZMP_{bias}$ is defined as a slope region in which the first fitness $e_1$ gradually decreases from the fixed value "1."

With respect to a second solution space defined by $C^{-1}$ determining the second action candidate, as shown in FIG. 7(b), the range of $0 \leq C^{-1} \leq \beta(R_{object})^{-1}$ is defined as a flat region in which the second fitness $e_2$ is a fixed value "1" and the range of $\beta(R_{object})^{-1} \leq C^{-1}$ is defined as a slope region in which the second fitness $e_2$ gradually decreases from the fixed value "1."

With respect to a third solution space defined by L determining the third action candidate, as shown in FIG. 8(b), the range of $L_{dest} \leq L \leq \gamma L_{dest}$ is defined as a flat region in which the third fitness $e_3$ is a fixed value "1" and the range of $\gamma L_{dest} < L$ is defined as a slope region in which the third fitness $e_3$ gradually decreases from the fixed value "1."

The formation of the flat region expands a region in which it is possible to search for a solution whose total fitness is the maximum or the local maximum in the j-th solution space. Therefore, if the high-order module is adapted to receive a low-order action candidate whose low-order total fitness is the maximum or the local maximum as a low-order action guideline from the low-order module and to evaluate the degree of approximation to the low-order action guideline as estimated low-order fitness with respect to each of the action candidates searched for by the high-order module, the region in which the high-order module can search for the solution in the solution space is expanded (see FIGS. 10 and 11).

Moreover, with respect to the plurality of the j-th action candidates included in the flat region in the j-th solution space, there is no need to consider the superiority and inferiority depending on the level of the j-th fitness $e_j$. This prevents a solution which increases the j-th fitness more than required from being searched for and thus prevents excessive optimization of the operation control of the controlled object. Furthermore, the j-th module only needs to search for the j-th action candidate whose total fitness is the maximum or the local maximum according to the fitness in view of the sub-purposes mainly under the charge of other modules (one or both of the (j−1)-th module and the (j+1)-th module). In other words, it is possible to cause the j-th module to focus on searching for a solution which increases the fitness in view of the sub-purposes, instead of the main purpose.

Accordingly, it is possible to evaluate or calculate the j-th total fitness $f_j$ while questing to reduce the arithmetic operation load of each module modj for evaluating the j-th fitness $e_j$ and consequently to enable earlier calculation of an arithmetic operation result (see the equations (141), (142), (241), (242), (341), and (342)). This enables the robot R to rapidly respond or act to a disturbance having an arbitrary form in an appropriate form in view of the action purpose of the robot R as a controlled object.

Another Embodiment of the Present Invention

The controlled object may be any kind of device having an actuator such as a vehicle, besides the robot R (see FIG. 1).

Although three action search modules are provided in the above embodiment, two action search modules or four or more action search modules may be used.

If the control system 1 includes only the first module mod1 and the second module mod2, the second total fitness $f_2(a_{i2})$ is evaluated according to an evaluation equation (244) on the basis of the second fitness $e_2(a_{i2})$ and the first fitness $e_1(a_{i2})$.

$$f_2(a_{i1}) = e_2(a_{i2})(e_1(a_{i2})+1) \qquad (244)$$

If the control system 1 further includes a fourth module mod4 of higher order (longer in operation period) than the third module mod3 as a component of the control system 1, the third total fitness $f_3(a_{i3})$ is evaluated according to an evaluation equation (343) similar to the evaluation equation (241) for the second total fitness $f_2(a_{i2})$.

$$f_3(a_{i3}) = e_3(a_{i3})(e_2(a_{i3})(e_4\hat{\ }(a_{i3})+1)+1) \qquad (343)$$

In this case, the fourth module mod4 evaluates the fourth total fitness $f_4(a_{i4})$ according to an evaluation equation similar to the evaluation equation (34) of the third total fitness $f_3(a_{i3})$.

Furthermore, if the control system 1 includes four action search modules as its components, further the second total fitness $f_2(a_{i2})$ may be evaluated according to an evaluation equation (244) on the basis of the second fitness $f_2(a_{i2})$, the first fitness $f_1(a_{i2})$, the third estimated fitness $e_3\hat{\ }(a_{i2})$, and further the fourth estimated fitness $e_4\hat{\ }(a_{i2})$.

$$f_2(a_{i2}) = e_2(a_{i2}) \times (e_1(a_{i2})(e_3\hat{\ }(a_{i2})(e_4\hat{\ }(a_{i2})+1)+1) \qquad (244)$$

If the control system 1 includes five or more action search modules as components, the total fitness of the intermediate modules is able to be calculated based on the same concept.

The invention claimed is:

1. A control system comprising at least one processor, the at least one processor comprising a plurality of modules hierarchically organized according to the level of a frequency band, wherein:

each of the plurality of modules has a main purpose, and is configured to search for a plurality of action candidates which are candidates for an action form of a controlled object, and to evaluate total fitness in view of both the main purpose and a sub-purpose, which is the main purpose of a lower-order module, in such a way that the contribution of a main fitness to the main purpose is higher than the contribution of a sub-fitness to the sub-purpose, with respect to each of the action candidates; and the control system is configured to control an operation of the controlled object in a form in which an evaluation result of the total fitness obtained by a high-order module of a high frequency is reflected in preference to an evaluation result of the total fitness obtained by a low-order module of a low frequency, and the main purposes of each the plurality of modules are reflected in the control of the operation of the controlled object by the control system.

2. The control system according to claim 1, wherein the plurality of modules comprise a highest-order module of highest frequency, a lowest-order module of lowest frequency, and an intermediate module configured to evaluate the total fitness in such a way that high-order fitness in view of a high-order purpose is higher in contribution than low-order fitness in view of a low-order purpose with respect to each of the action candidates with the high-order purpose of the high-order module of a frequency higher than the low-order module, and the low-order purpose of the low-order module of a frequency lower than the high-order module as the sub-purposes.

3. The control system according to claim 2, wherein the low-order module is configured to evaluate estimated low-order fitness by estimating the low-order fitness with respect to each of the action candidates and evaluate the total fitness with the estimated low-order fitness as the low-order fitness.

4. The control system according to claim 3, wherein the low-order module is configured to receive a low-order action candidate whose low-order total fitness, as the total fitness evaluated by the low-order module, among low-order action candidates as the action candidates searched for by the low-order module, is a maximum or a local maximum as a low-order action guideline from the low-order module and evaluate a degree of approximation to the low-order action guideline as the estimated low-order fitness with respect to each of the action candidates searched for by the low-order module.

5. The control system according to claim 3, further comprising first to N-th modules as the plurality of modules, wherein:
a first module as the highest-order module is configured to evaluate first fitness $e_1$ to a first purpose as the main purpose with respect to each of first action candidates as the action candidates searched for by the first module, evaluate second estimated fitness $e_2\hat{}$ by estimating fitness to a second purpose of a second module as a low-order module, and then evaluate first total fitness $f_1$ according to an evaluation equation $f_1 = e_1(e_2\hat{}+1)$;
an i-th module (i=2 to N−1) as the intermediate module is configured to evaluate i-th fitness $e_i$ in view of an i-th purpose as the main purpose with respect to each of i-th action candidates as the action candidates searched for by the i-th module, evaluate (i−1)th fitness $e_{-1}$ in view of the (i−1)th purpose as the high-order purpose, evaluate (i+1)th estimated fitness by estimating fitness in view of an (i+1)th purpose as the low-order purpose, and then evaluate the i-th total fitness $f_i$ according to an evaluation equation $f_i = e_i(e_{i-1}(e_{i+1}\hat{}+1)+1)$; and
an N-th module as the lowest-order module is configured to evaluate N-th fitness $e_N$ to an N-th purpose as the main purpose with respect to each of N-th action candidates as the action candidates searched for by the N-th module, evaluate the (N−1)th fitness $e_{N-1}$ of an (N−1)th module as the high-order module, and then evaluate the i-th total fitness $f_i$ according to an evaluation equation $f_N = e_N(e_{N-1})$.

6. The control system according to claim 5, wherein the j-th module (j=1, 2, - - - , N) is configured to evaluate j-th fitness $e_j$ to a j-th purpose as the main purpose at a fixed value, with respect to j-th action candidates included in j-th specified action candidate group among all j-th action candidates as the action candidates searched for by the j-th module, while evaluating the j-th fitness $e_j$ at a value lower than the fixed value with respect to the j-th action candidates not included in the j-th specified action candidate group among all j-th action candidates.

7. The control system according to claim 6, wherein the j-th module is configured to evaluate the j-th fitness $e_j$ at the fixed value, with the j-th action candidates whose divergence from a reference point defined in a state space adequate for the j-th purpose among all of the j-th action candidates is equal to or less than a j-th threshold as the j-th action candidates included in the j-th specified action candidate group, while evaluating the j-th fitness $e_j$ according to a decreasing function in which the divergence is continuous or progressive on the basis of the divergence with respect to the j-th action candidates not included in the j-th specified action candidate group among all of the j-th action candidates.

8. The control system according to claim 1, wherein each of the modules is configured to search for action candidates which are candidates for the action form of the controlled object matching with the main purpose and the sub-purpose while giving priority to the main purpose over the sub-purpose.

9. The control system according to claim 8, wherein each of the modules is configured to perform the current time's search for action candidates of the controlled object according to a search strategy based on a previous time's search result obtained by the module and a previous time's search result of the action candidates of the controlled object obtained by the any other module while giving priority to the previous time's search result of the action candidates of the controlled object by the module over the previous time's search result of the action candidates of the controlled object by the any other module.

10. The control system according to claim 9, wherein each of the modules is configured to select a part of the action candidates searched for at the previous time with higher probability as the total fitness evaluated at the previous time is higher and perform the current time's search for the action candidates in a peripheral region of the selected action candidates in the state space defined by the action candidates.

11. The control system according to claim 10, wherein each of the modules is configured to perform the current time's search for the action candidates in a narrower peripheral region as the total fitness evaluated at the previous time is higher with reference to the action candidates selected among the action candidates searched for at the previous time in the state space.

12. The control system according to claim 10, wherein each of the modules is configured to perform the current time's search for the action candidates in a peripheral region of irregularly selected points in the state space in addition to the peripheral region of the action candidates selected among the action candidates searched for at the previous time.

13. The control system according to claim 12, wherein each of the modules is configured to search for the action candidates of the controlled object, with a high-order module as the any other module in the case where there is a module one order higher than the module and with a low-order module as the any other module in the case where there is a module one order lower than the module.

14. The control system according to claim 8, wherein:
- each of the modules is configured to search for the action candidates which determine the position or the position and posture of a moving apparatus as the controlled object; and
- each of the modules is configured to search for the action candidates of the moving apparatus for a shorter period in comparison with the low-order module of a low frequency as the high-order module has a higher frequency.

15. The control system according to claim 14, comprising a first module, a second module, and a third module, as the plurality of modules, configured to search for the position trajectory or the position trajectory and posture trajectory of a robot as the moving apparatus having a base and a plurality of legs extended from the base, as the action candidates, wherein:
- the first module is configured to search for a gait over a first specified number of steps of the robot for causing the robot to stabilize the posture as a first action candidate;
- the second module is configured to search for a local route, as a second action candidate, which determines a gait over a second specified number of steps, which is greater than the first specified number of steps, for causing the robot to prevent a contact with an object; and
- the third module is configured to search for a general route for causing the robot to reach a target position as a third action candidate.

16. The control system according to claim 1, wherein each of the modules is configured to predict a plurality of future states of the controlled object according to each of the action candidates searched for by the module and evaluate the total fitness on the basis of each of the future states with respect to each of the action candidates.

17. The control system according to claim 16, wherein:
- the module having a high-order module of a higher frequency than the module is configured to predict further future states of the controlled object subsequent to the future states of the controlled object predicted by the high-order module; and
- the operation of the controlled object is configured to be controlled in a form in which the evaluation result of the total fitness obtained by the high-order module of a high frequency is reflected in precedence to the evaluation result of the total fitness by the low-order module of a low frequency.

18. The control system according to claim 17, wherein each of the modules is configured to search for the action candidates of a moving apparatus for a shorter period in comparison with the low-order module of a low frequency as the high-order module has a higher frequency.

19. The control system according to claim 18, wherein at least one module among the plurality of modules is configured to predict the state of the controlled object at a future time point after an elapse of a shorter period of an action form than the action candidates searched for by a highest frequency module according to the current state of the controlled object, as a nearest future state; and
- each of the plurality of modules is configured to predict the future state of the controlled object according to the action candidates searched for by the module, subsequent to the nearest future state.

20. The control system according to claim 18, wherein each of the modules is configured to search for the action candidates which determine the position or the position and posture of the moving apparatus as the controlled object and predict the position or the position and posture of the moving apparatus as the future state of the controlled object.

21. The control system according to claim 20, comprising a first module, a second module, and a third module, as the plurality of modules, configured to search for the position trajectory or the position trajectory and posture trajectory of a robot as the moving apparatus having a base and a plurality of legs extended from the base as the action candidates, wherein:
- the first module is configured to search for a gait over a first specified number of steps of the robot for causing the robot to stabilize the posture as a first action candidate and predict the position or the position and posture in the future of the robot according to each of the first action candidates as a plurality of first future states;
- the second module is configured to search for a local route, as a second action candidate, which determines a gait over a second specified number of steps, which is greater than the first specified number of steps, for causing the robot to prevent a contact with an object and predict the position or the position and posture in the future of the robot according to each of the second action candidates as a plurality of second future states; and
- the third module is configured to search for a general route to cause the robot to reach a target position or to cause the robot to reach the target position with a target posture as a third action candidate, and predict the position or the position and posture in the future of the robot according to each of the third action candidates as a plurality of third future states.

22. The control system according to claim 21, wherein:
- at least one module among the first module, the second module, and the third module is configured to predict the position or the position and posture of the robot at a future time point after an elapse of a gait over a reference number of steps less than the first specified number of steps as the nearest future state according to the current state of the robot; and
- the first module is configured to predict the position or the position and posture of the robot at the future time point after an elapse of a gait over the first specified number of steps as the first future state with the nearest future state as the origin;
- the second module is configured to predict the position trajectory or the position trajectory and posture trajectory of the robot moving along the local route as the second future state with the nearest future state as the origin; and
- the third module is configured to predict the position trajectory or the position trajectory and posture trajectory of the robot moving along the general route as the third future state with the nearest future state as the origin.

23. A robot comprising:
- a base and a plurality of legs extended from the base, the robot being a moving apparatus which moves with the movements of the plurality of legs; and
- a control system comprising at least one processor, the at least one processor comprising a plurality of modules hierarchically organized according to the level of a frequency band, wherein:
- each of the plurality of modules has a main purpose, and is configured to search for a plurality of action candidates which are candidates for an action form of a controlled object, and to evaluate total fitness in view of both the main purpose and a sub-purpose, which is the main purpose of a lower-order module, in such a way that the contribution of a main fitness to the main purpose is higher than the contribution of a sub-fitness to the sub-purpose, with respect to each of the action candidates;

the control system is configured to control an operation of the controlled object in a form in which an evaluation result of the total fitness obtained by a high-order module of a high frequency is reflected in preference to an evaluation result of the total fitness obtained by a low-order module of a low frequency, and the main purposes of each the plurality of modules are reflected in the control of the operation of the controlled object by the control system;

each of the modules is configured to search for action candidates which are candidates for the action form of the controlled object matching with the main purpose and the sub-purpose while giving priority to the main purpose over the sub-purpose;

each of the modules is configured to search for the action candidates which determine the position or the position and posture of a moving apparatus as the controlled object;

each of the modules is configured to search for the action candidates of the moving apparatus for a shorter period in comparison with the low-order module of a low frequency as the high-order module has a higher frequency; and the control system further comprises a first module, a second module, and a third module, as the plurality of modules, configured to search for the position trajectory or the position trajectory and posture trajectory of a robot as the moving apparatus having a base and a plurality of legs extended from the base, as the action candidates, wherein:

the first module is configured to search for a gait over a first specified number of steps of the robot for causing the robot to stabilize the posture as a first action candidate;

the second module is configured to search for a local route, as a second action candidate, which determines a gait over a second specified number of steps, which is greater than the first specified number of steps, for causing the robot to prevent a contact with an object; and the third module is configured to search for a general route for causing the robot to reach a target position as a third action candidate.

24. A robot comprising:

a base and a plurality of legs extended from the base, the robot being a moving apparatus which moves with the movements of the plurality of legs; and a control system comprising at least one processor, the at least one processor comprising a plurality of modules hierarchically organized according to the level of a frequency band, wherein:

each of the plurality of modules has a main purpose, and is configured to search for a plurality of action candidates which are candidates for an action form of a controlled object, and to evaluate total fitness in view of both the main purpose and a sub-purpose, which is the main purpose of a lower-order module, in such a way that the contribution of a main fitness to the main purpose is higher than the contribution of a sub-fitness to the sub-purpose, with respect to each of the action candidates;

the control system is configured to control an operation of the controlled object in a form in which an evaluation result of the total fitness obtained by a high-order module of a high frequency is reflected in preference to an evaluation result of the total fitness obtained by a low-order module of a low frequency, and the main purposes of each the plurality of modules are reflected in the control of the operation of the controlled object by the control system;

each of the modules is configured to predict a plurality of future states of the controlled object according to each of the action candidates searched for by the module and evaluate the total fitness on the basis of each of the future states with respect to each of the action candidates;

the module having a high-order module of a higher frequency than the module is configured to predict further future states of the controlled object subsequent to the future states of the controlled object predicted by the high-order module;

the operation of the controlled object is configured to be controlled in a form in which the evaluation result of the total fitness obtained by the high-order module of a high frequency is reflected in precedence to the evaluation result of the total fitness by the low-order module of a low frequency;

each of the modules is configured to search for the action candidates of a moving apparatus for a shorter period in comparison with the low-order module of a low frequency as the high-order module has a higher frequency;

each of the modules is configured to search for the action candidates which determine the position or the position and posture of the moving apparatus as the controlled object and predict the position or the position and posture of the moving apparatus as the future state of the controlled object; and the control system further comprises a first module, a second module, and a third module, as the plurality of modules, configured to search for the position trajectory or the position trajectory and posture trajectory of a robot as the moving apparatus having a base and a plurality of legs extended from the base as the action candidates, wherein:

the first module is configured to search for a gait over a first specified number of steps of the robot for causing the robot to stabilize the posture as a first action candidate and predict the position or the position and posture in the future of the robot according to each of the first action candidates as a plurality of first future states;

the second module is configured to search for a local route, as a second action candidate, which determines a gait over a second specified number of steps, which is greater than the first specified number of steps, for causing the robot to prevent a contact with an object and predict the position or the position and posture in the future of the robot according to each of the second action candidates as a plurality of second future states; and the third module is configured to search for a general route to cause the robot to reach a target position or to cause the robot to reach the target position with a target posture as a third action candidate, and predict the position or the position and posture in the future of the robot according to each of the third action candidates as a plurality of third future states.

* * * * *